(12) United States Patent
Huynh et al.

(10) Patent No.: US 12,729,650 B1
(45) Date of Patent: Sep. 8, 2026

(54) HYBRID TURBINE STARTER FOR A GAS TURBINE ENGINE

(71) Applicants: Unison Industries, LLC, Jacksonville, FL (US); General Electric Company, Evendale, OH (US)

(72) Inventors: Phuc Huynh, Federal Way, WA (US); Nagendra Baddam, Bengaluru (IN)

(73) Assignees: Unison Industries, LLC, Jacksonville, FL (US); General Electric Company, Evendale, OH (US)

( * ) Notice: Subject to any disclaimer, the term of this patent is extended or adjusted under 35 U.S.C. 154(b) by 0 days.

(21) Appl. No.: 19/249,324

(22) Filed: Jun. 25, 2025

(51) Int. Cl.

| | |
|---|---|
| ***F02C 7/277*** | (2006.01) |
| ***F02C 6/00*** | (2006.01) |
| ***G01B 7/30*** | (2006.01) |
| ***G01M 15/14*** | (2006.01) |
| ***H02K 7/18*** | (2006.01) |

(52) U.S. Cl.
CPC ................ *F02C 7/277* (2013.01); *F02C 6/00* (2013.01); *G01B 7/30* (2013.01); *G01M 15/14* (2013.01); *H02K 7/1823* (2013.01); *F05D 2260/85* (2013.01)

(58) Field of Classification Search
CPC ............. F05D 2220/76; F05D 2260/85; F05D 2220/50; F05D 2220/323; F05D 2220/32; F02C 6/00; F02C 7/277; F02C 7/32; F02C 7/36; F02C 7/26; F02C 7/268; F02C 7/275; F01D 15/10; F01D 19/00; F01D 25/36; B64D 27/33; B64D 31/18; B64D 2221/00; G01B 7/30; G01M 15/14; H02K 7/1823
See application file for complete search history.

(56) References Cited

U.S. PATENT DOCUMENTS

| | | | | |
|---|---|---|---|---|
| 7,854,582 | B2 | 12/2010 | Ullyott | |
| 9,121,309 | B2 | 9/2015 | Geiger | |
| 10,428,682 | B2 | 10/2019 | Coldwate | |
| 10,443,505 | B2 * | 10/2019 | Virtue, Jr. | F01D 25/34 |
| 10,443,507 | B2 | 10/2019 | Schwarz | |
| 10,508,601 | B2 | 12/2019 | Sheridan | |
| 10,598,047 | B2 | 3/2020 | Clauson | |
| 10,801,371 | B2 * | 10/2020 | Clauson | F01D 21/00 |
| 11,015,532 | B2 * | 5/2021 | Kusnierek | F01D 19/00 |
| 11,261,795 | B2 * | 3/2022 | Kusnierek | F01D 19/00 |
| 11,454,172 | B2 * | 9/2022 | Sridharan | H02K 16/00 |
| 12,018,578 | B1 | 6/2024 | Schafer | |
| 12,060,839 | B1 | 8/2024 | Muldoon | |
| 12,180,894 | B1 * | 12/2024 | Lawrence | F01D 19/00 |
| 2021/0285381 | A1 | 9/2021 | Tomescu | |
| 2024/0186889 | A1 * | 6/2024 | Nadarajan | H02M 7/53871 |
| 2024/0191658 | A1 | 6/2024 | Donnelly | |
| 2025/0035046 | A1 * | 1/2025 | Lawrence | F02C 7/277 |
| 2025/0035048 | A1 | 1/2025 | Baddam | |
| 2025/0237153 | A1 * | 7/2025 | Escure | F01D 25/36 |

* cited by examiner

*Primary Examiner* — Eric J Zamora Alvarez
(74) *Attorney, Agent, or Firm* — McGarry Bair PC

(57) ABSTRACT

A Hybrid Turbine Starter (HTS) for a gas turbine engine. The HTS has a turbine member, a turbine shaft, an electric machine, and a Power Electronic Converter (PEC). The electric machine has a rotor and an electric machine drive shaft. The PEC has a current sensor, a voltage sensor, and a controller module. The controller module is configured to selectively supply a sequence of electrical pulses to the electric machine.

20 Claims, 8 Drawing Sheets

170

HYBRID TURBINE STARTER FOR A GAS TURBINE ENGINE

TECHNICAL FIELD

The disclosure generally relates to a hybrid turbine starter, and more specifically to a hybrid turbine starter having an electric machine and a power electronics converter.

BACKGROUND

A gas turbine engine, for example a gas turbine engine, is typically started via an air turbine starter (ATS). The ATS is often mounted near the gas turbine engine and the ATS can be coupled to a high-pressure fluid source, such as compressed air, which impinges upon a turbine rotor in the ATS, causing the turbine rotor to rotate at a relatively high rate of speed. The ATS includes an output shaft that is driven by the turbine rotor, typically through a reducing gearbox, where the output shaft provides rotational energy to a rotatable element of the gas turbine engine (e.g., the crankshaft or the rotatable shaft) to begin rotating. The rotation by the ATS continues until the gas turbine engine attains a self-sustaining operating rotational speed.

DETAILED DESCRIPTION

Figure 1:
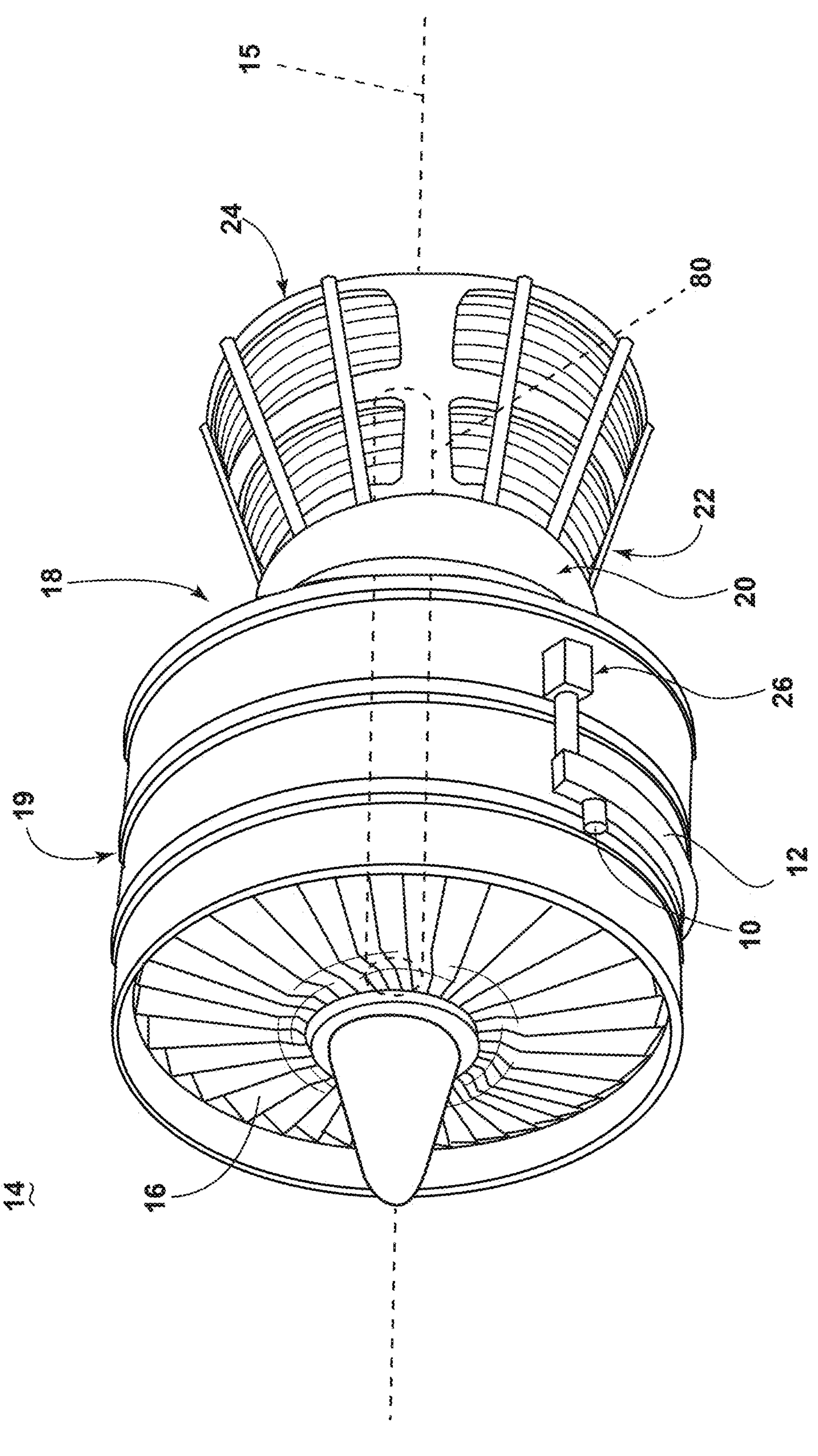
FIG. 1 is a schematic illustration of a gas turbine engine with a hybrid turbine starter, in accordance with various aspects described herein.

Aspects of this disclosure are related to a hybrid turbine starter (HTS). Specifically, an HTS for a gas turbine engine. The HTS comprises an electric machine and a power electronics converter (PEC). The electric machine has a rotor and a stator. The rotor is rotatable about a rotational axis. The rotor has a rotor magnetic orientation. The rotor magnetic orientation is defined by an instantaneous positioning of a first pole (e.g., a positive pole) and a second pole (e.g., a negative pole) of the rotor. The PEC can include a voltage sensor and a set of current sensors. The PEC has a controller module. The controller module is configured to supply a supply of electrical power in the form of a sequence of electrical pulses to the electric machine. As used herein, an "electrical pulse" is defined as a constant flow of or supply of electrical power (e.g., current) to the electric machine over a non-zero finite time. As a non-limiting example, selectively supplying 120 amps from an 800 Volt supply of electrical power over 10 seconds constitutes a singular electrical pulse. It will be appreciated that in some instances, the voltage supplied to the electric machine from the supply of electrical power is selectively controlled on and off (e.g., selectively supplied) via the PEC. Put another way, during the non-zero finite time, the PEC can switch the voltage supplied on (being supplied to the electric machine) and off (not being supplied to the electric machine). The switching of the voltage being supplied to the electric machine and the value of the voltage are used to form each respective electrical pulse of the sequence of electrical pulses.

Each electrical pulse of the sequence of electrical pulses defines a stator magnetic orientation. Each successive electrical pulse of the sequence of electrical pulses is configured to rotate the rotor in a common direction through an alignment of the rotor magnetic axis with the respective stator magnetic axis. The PEC is further configured to determine a current rotational orientation of the rotor (e.g., a current location of the rotor magnetic orientation) based on a direct current (DC) voltage value from the voltage sensor and a current signal from the set of current sensors.

The PEC measures a DC voltage value through use of the voltage sensor. The PEC measures a current value through use of the set of current sensors. The PEC is configured to determine the rotational position of the rotor through a closed loop system using the DC voltage value and the current signal. The PEC is configured to determine the rotational position of the rotor without use of a position sensor (e.g., a sensor that physically measures the movement of and/or circumferential location of the rotor with respect to the rotational axis). Instead, the PEC determines a positioning of the rotor based on the current signal and the DC voltage value. The elimination of the position sensor decreases the complexity of the HTS described herein in comparison to a conventional HTS.

Rotation of the rotor ultimately causes rotation of an output shaft of the HTS. The output shaft is couplable to an engine drive shaft of the gas turbine engine. Rotation of the output shaft affects a rotation of the engine drive shaft when the engine drive shaft and the output shaft are coupled to one another. As such, the movement of the rotor, through the use of the sequence of electrical pulses, allows for a torque to be transferred from the output shaft to the engine drive shaft, thus driving the engine drive shaft.

After shutdown of the gas turbine engine (e.g., combustion is no longer occurring and the gas turbine engine is winding down), the HTS drives the engine drive shaft. The continued driving of the engine drive shaft after shutdown of the gas turbine engine is used to counter the effects of thermal bowing, to supply a cooling fluid through respective portions of the gas turbine engine, and to perform maintenance procedures.

While in some examples the disclosure is described in connection with gas turbine engines for an aircraft, this disclosure is applicable to other non-aircraft applications or other gas turbine engine environments. Non-limiting examples of where this disclosure can be applied include other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms such as "first", "second", etc. may be used interchangeably to distinguish one component from another and are not intended to signify location or importance of the individual components.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a gas turbine engine, radial refers to a direction along a ray extending between a center longitudinal axis of the engine and an outer engine circumference. Furthermore, as used herein, the term "set" or a "set" of elements can be any number of elements, including only one.

Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, a "controller" or "controller module" can include a component configured or adapted to provide instruction, control, operation, or any form of communication for operable components to affect the operation thereof. A controller or controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g, for encoding, decoding, transcoding, etc.), the like, or a combination thereof. Non-limiting examples of a controller or controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller or controller module can also include a data storage component accessible by the processor, including memory, whether transient, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

Additionally, as used herein, elements being "electrically connected," "electrically coupled," or "in signal communication" can include an electric transmission or signal being sent, received, or communicated to or from such connected or coupled elements. Furthermore, such electrical connections or couplings can include a wired or wireless connection, or a combination thereof.

As used herein, "hybrid turbine starter (HTS)" refers to an air turbine starter (ATS) having a turbine member selectively operably coupled to an electric machine. A housing, which can be several components coupled together, encases or surrounds at least a portion of the electric machine and the turbine member of the air turbine starter. The HTS can be a hybrid pneumatic electric starter (HPES), where the turbine member is driven by pressurized air (pneumatically) or by electrical energy.

FIG. 1 is a schematic view of a gas turbine engine 14 having an air turbine starter (ATS) illustrated as a hybrid turbine starter (HTS) 10. The HTS 10 is coupled to an accessory gear box (AGB) 12, which are both schematically illustrated as being mounted to the gas turbine engine 14. The gas turbine engine 14 defines an engine centerline 15 extending in an axial direction.

The gas turbine engine 14 includes an air intake with a fan 16 that supplies air to a low-pressure compression section 19 and a high-pressure compression section 18. The gas turbine engine 14 includes a high-pressure turbine section 22 and a low-pressure turbine section 24. While illustrated by way of example at a radially outer portion of a fan casing 17, it is contemplated that the HTS 10 can couple to any portion of the gas turbine engine 14. By way of non-limiting example, the HTS 10 can be located radially inward if the fan casing 17 and/or shifted in an axial direction.

The fan 16, the low-pressure compression section 19, and the high-pressure compression section 18 collectively are known as the "cold section" of the gas turbine engine 14. A combustion section 20, the high-pressure turbine section 22, and the low-pressure turbine section 24 collectively are known as the "hot section" of the gas turbine engine 14.

The gas turbine engine 14 includes an engine drive shaft 80. The engine drive shaft 80 rotationally couples the high-pressure turbine section 22 and the low-pressure turbine section 24 to the high-pressure compression section 18, the low-pressure compression section 19, and the fan 16. While illustrated as singular body, the engine drive shaft 80 can include two or more discrete bodies. As a non-limiting example, the engine drive shaft 80 can include a first engine drive shaft and a second engine drive shaft. The first engine drive shaft can rotationally couple the high-pressure turbine section 22 to the high-pressure compression section 18. The second engine drive shaft can rotationally couple the low-pressure turbine section 24 to the low-pressure compression section 19 and the fan 16. Further, one or more speed reduction devices (e.g., power gearbox) can be included to vary rotation speeds between portions of the gas turbine engine 14. For example, the second engine drive shaft can rotationally couple the low-pressure turbine section 24 to the low-pressure compression section 19 and a power gearbox that is coupled to the fan 16. The power gearbox allows the fan 16 to rotate a different speed than portions of the low-pressure turbine section 24 to the low-pressure compression section 19, The AGB 12 is coupled to the gas turbine engine 14 at either the high-pressure turbine region 22 or the low-pressure turbine region 24. The coupling between the AGB 12 and the gas turbine engine can be, for example, by way of a mechanical power take-off 26. The mechanical power take-off 26 contains multiple gears and components for mechanical coupling of the AGB 12 to the gas turbine engine 14. Under normal operating conditions, the power take-off 26 translates power from the gas turbine engine 14 to the AGB 12 to power accessories of the aircraft for example but not limited to fuel pumps, electrical systems, and cabin environment controls. The HTS 10 can be mounted on the outside of either the air intake region containing the fan 16 or on the core near the high-pressure compression region 18.

During operation, an ambient airflow is drawn in through the fan 16. The ambient airflow is fed to the low-pressure compression section 19 and pressurized to a defined pressurized airflow. The pressurized airflow from the low-pressure compression section 19 is fed to the high-pressure compression section 18 where the pressurized airflow is yet further pressurized. The pressurized airflow from the high-pressure compression section 18 is fed to the combustion section 20 where the pressurized airflow is mixed with fuel and combusted to define combustion gases. The combustion gases are fed to the high-pressure turbine section 22 where a work is extracted from the combustion gases. The work extracted from the combustion gases drives at least a portion of the engine drive shaft 80; specifically, a portion of the engine drive shaft 80 that couples the high-pressure turbine section 22 to the high-pressure compression section 18. As such, the high-pressure turbine section 22 drives the high-pressure compression section 18. The combustion gases from the high-pressure turbine section 22 are then fed to the low-pressure turbine section 24 where additional work is extracted from the combustion gases. The additional work extracted from the combustion gases drives at least a portion of the engine drive shaft 80; specifically, a portion of the engine drive shaft 80 that couples the low-pressure turbine section 24 to the low-pressure compression section 19, the fan 16, or a combination thereof. As such, the low-pressure turbine section 24 drives the low-pressure compression section 19 and/or the fan 16. The combustion gases within the low-pressure turbine section 24 are exhausted from the gas turbine engine 14.

Figure 2:
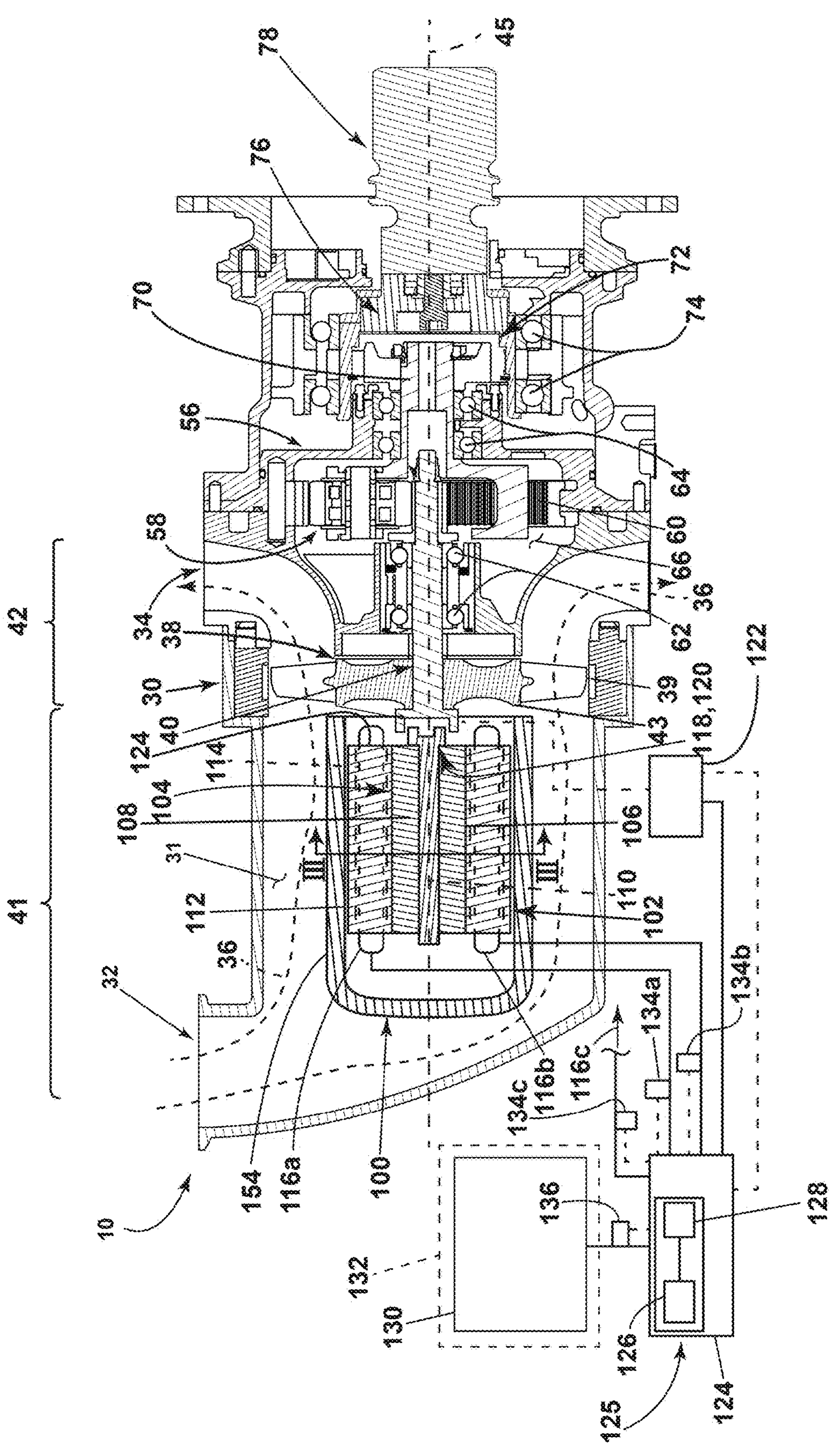
FIG. 2 is a schematic cross-sectional view of the hybrid turbine starter of FIG. 1, further illustrating an electric machine, and a power electronics converter having a controller module in accordance with the various aspects described herein.

FIG. 2 is a schematic cross section of the HTS 10 of FIG. 1. The HTS 10 includes a housing 30 defining an interior 31. The housing 30 includes an inlet 32 and an outlet 34. A primary airflow path 36 extends between the inlet 32 and outlet 34 for communicating a flow of fluid therethrough. In one non-limiting example the fluid is air, such as pressurized air, which is provided from a pressurized air supply, including but not limited to, a ground cart, an auxiliary power unit, or a cross-bleed start from an engine already operating. The HTS 10 includes a turbine member 38 located at the interior 31 of the housing 30. The turbine member 38 includes a plurality of blades 39 circumferentially spaced about the turbine member 38. The plurality of blades 39 are disposed within the primary airflow path 36.

A turbine shaft 40 is coupled to the turbine member 38. The turbine shaft 40 can rotatably extract mechanical power from the flow of air along the primary airflow path 36 via the plurality of blades 39, which thereby rotates the turbine shaft 40. The turbine shaft 40 is rotatable about an HTS rotational axis 45.

It is important to note that the HTS 10 is functionally and structurally different than the gas turbine engine 14 (FIG. 1). The HTS 10 is provided with a compressed air source to rotate the turbine member 38. The rotating of the turbine member 38 and turbine shaft 40 of the HTS 10 is used to start the gas turbine engine 14. Other than compressed air, the turbine member 38 can also be rotated by an electric machine 100 operably coupled and located within the housing 30 of the HTS 10 with the turbine shaft 40. The electric machine 100 will be described in further detail below. The gas turbine engine 14 further distinguishes from the HTS 10 as the gas turbine engine 14 uses the Brayton cycle (or Joule cycle), which involves intake, compression, combustion, and exhaust. The operating environment, requirements, structure, and function of the HTS 10 and the gas turbine engine 14 differ significantly.

The primary airflow path 36 has at least a first portion 41 and a second portion 42. The first portion 41 is defined from the inlet 32 to an upstream face 43 of the turbine member 38. The second portion 42 is defined from the upstream face 43 of the turbine member 38 to an aft portion of the housing 30 defining the outlet 34.

A gear train 58 can be located within a gear box 56 and drivingly coupled with the turbine member 38. In the illustrated example, the gear train 58 includes a ring gear 60. It will be understood that the gear train 58 can include any suitable gear assembly including, but not limited to, a planetary gear assembly, a pinion gear assembly, or the like. The turbine shaft 40 couples the gear train 58 to the plurality of blades 39 allowing for the transfer of mechanical power to the gear train 58. The turbine shaft 40 is coupled to the gear train 58 and rotatably supported by a pair of turbine bearings 62. The gear train 58 can be supported by one or more bearings, illustrated as a pair of carrier bearings 64.

A gear box interior 66 can be provided for containing a lubricant, including, but not limited to, grease or oil. The gear box interior 66 can provide lubrication and cooling to mechanical parts contained therein, such as the gear train 58, ring gear 60, turbine bearings 62, carrier bearings 64, or the like.

A carrier shaft 70 and a clutch 72 can be supported by one or more bearings, illustrated as a pair of spaced bearings 74. A drive shaft 76 is coupled to the clutch 72 and illustrated as additionally supported by the pair of spaced bearings 74. The drive shaft 76 is driven by the gear train 58 and selectively couples to an output shaft 78 such that during a starting operation, the drive shaft 76 provides a driving motion to the output shaft 78. It is contemplated that one or more decoupling devices selectively coupled the output shaft 78 to one or more portions of the gas turbine engine 14 (FIG. 1).

The electric machine 100 includes a stator 102, a rotor 104, and an electric machine drive shaft 108. The electric machine 100 can be located within the housing 30. In the non-limiting example shown, the electric machine 100 is an electric motor. However, it is contemplated in a non-limiting example, that the electric machine 100 can include an electric generator.

The rotor 104 includes a rotor core 106. The rotor core 106 is rotatable about a rotational axis 110. The rotational axis 110 can be in-line with (e.g., parallel with and coincide with) the HTS rotational axis 45. Alternatively, the rotational axis 110 can be offset from, non-parallel with, or a combination thereof with the HTS rotational axis 45.

The stator 102 includes a stator core 112 and a set of slots 114 illustrated in phantom lines. The set of slots 114 are circumferentially spaced, with respect to the rotational axis 110 along the stator core 112.

The stator 102 includes a set of windings **116*a*, 116*b*, 116*c*. The set of windings 116*a*, 116*b*, 116*c* are broken down into one or more groups. The one or more groups is based on the number of phases of the electric machine 100. The electric machine 100, as illustrated, is a three-phase electric machine. As such, the set of windings 116*a*, 116*b*, 116*c* include a first group of windings 116*a*, a second group of windings 116*b*, and a third group of windings 116*c*. The first group of windings 116*a* forms a first phase, the second group of windings 116*b* forms a second phase, while the third group of windings 116*c* forms a third phase of the electric machine 100. When collectively referring to the first group of windings 116*a*, the second group of windings 116*b*, and the third group of windings 116*c*, the term "the set of windings 116*a*, 116*b*, 116*c*" will be used. The set of windings 116*a*, 116*b*, 116*c* are partially illustrated in phantom lines. The set of windings 116*a*, 116*b*, 116*c* extend through the set of slots 114 and axially outwardly from respective ends of the stator core 112**.

The rotor 104 and the electric machine drive shaft 108 are configured to rotate relative to the stationary (i.e. non-rotating) stator 102. By way of non-limiting example, the rotor 104 can be an inner rotor. That is, the rotor 104 can be located radially within the stator 102. That is, at least a portion of the stator 102 circumscribes a portion of the rotor 104.

The rotor 104 is drivingly coupled to the electric machine drive shaft 108. The rotor 104 and the electric machine drive shaft 108 are coupled in such a way that rotational movement of the rotor core 106 is transferred to the electric machine drive shaft 108. As such, the electric machine drive shaft 108 rotates with the rotor 104 about the rotational axis 110.

The electric machine 100 includes an electric machine housing 154. The electric machine housing 154 at least partially defines at least a portion of the primary airflow path 36. In a non-limiting example, the electric machine housing 154 can guide air from the inlet 32 to the turbine member 38. That is, the electric machine housing 154 can create a smooth flow path around the electric machine 100.

The electric machine 100 includes an electric machine clutch 118. The electric machine clutch 118 is any suitable clutch. As a non-limiting example, the electric machine clutch 118 is one of a dry clutch, a wet clutch, a centrifugal clutch, a cone clutch, an electromagnetic clutch, or the like. The electric machine clutch 118 can include an engagement body 120 and a clutch actuator 122.

The engagement body 120 is defined as any suitable body or assembly configured to provide contact between and selectively lock a respective rotatable portion of the HTS 10 to the electric machine drive shaft 108. Specifically, the engagement body 120 is defined as a portion of the electric machine 100 that is configured to engage a respective portion of the turbine shaft 40. As a non-limiting example, the engagement body 120 is configured to come into contact with and transfer a torque from the electric machine drive shaft 108 and to the turbine shaft 40. While the engagement body 120 is described as a discrete body from the electric machine drive shaft 108, it will be appreciated that any suitable structure of body of the electric machine 100 can define the engagement body 120. As a non-limiting example, the engagement body 120 can be integrally formed with the electric machine drive shaft 108.

The clutch actuator 122 is defined as a body, structure, or the like that is configured to cause movement of the engagement body 120. The clutch actuator 122 can, for example, be a motor.

The HTS 10 is couplable to a supply of electrical power 130. Specifically, the electric machine 100 of the HTS 10 is couplable to the supply of electrical power 130. The supply of electrical power 130 is defined as any suitable source of electrical energy. As a non-limiting example, the supply of electrical power 130 can be, but is not limited to, a ground power (e.g., a power mains at an airport, a ground cart, or the like), a battery, a generator, an engine, or the like.

The supply of electrical power 130 is located within an electrical power environment 132, illustrated in phantom lines. The electric power environment 132 can be, but is not limited to, a ground cart, a building, an aircraft, a portion of the gas turbine engine 14 (FIG. 1) or the like. When the electric power environment 132 is the aircraft including the gas turbine engine 14 (FIG. 1), the supply of electrical power 130 is defined as an on-board supply of electrical power that is accessible to the HTS 10 regardless of an operational state of the gas turbine engine 14 (e.g., powered on, shutdown, etc.). When the electric power environment 132 is the ground cart, the supply of electrical power 130 is defined as an off-board supply of electrical power that is accessible to the HTS 10 dependent on the operational state of the gas turbine engine 14. Specifically, the ground cart (e.g., the supply of electrical power 130) is only hooked up to the HTS 10 once the gas turbine engine 14 has shutdown, is actively shutting down, or is in a startup process.

The HTS 10 includes a power electronics converter (PEC) 125. The electric machine 100 couples to the power electronics converter (PEC) 125. The PEC 125 includes a controller module 124, a set of current sensors **134*a*, 134*b*, 134*c*, and a voltage sensor 136**.

The set of current sensors **134*a*, 134*b*, 134*c* include any number of one or more sensors. As a non-limiting example, the set of current sensors 134*a*, 134*b*, 134*c* include a first current sensor 134*a*, a second current sensor 134*b*, and a third current sensor 134*c*. When collectively referring to the first current sensor 134*a*, the second current sensor 134*b*, and the third current sensor 134*c*, the term "the set of current sensors 134*a*, 134*b*, 134*c*" will be used. A total number of current sensors in the set of current sensors 134*a*, 134*b*, 134*c* can equal a total number of groups in the set of windings 116*a*, 116*b*, 116*c*. Each current sensor of the set of current sensors 134***a*, 134*b*, 134*c* corresponds to one group of the set of windings 116*a*, 116*b*, 116*c*. Specifically, the first current sensor 134*a* corresponds to the first group of windings 116*a*, the second current sensor 134*b* corresponds to the second group of windings 116*b*, and the third current sensor 134*c* corresponds to the third group of windings 116*c*. As used herein, the use of the phrase "corresponds to" in terms of the set of current sensors 134*a*, 134*b*, 134*c* and the set of windings 116*a*, 116*b*, 116*c* refers to which group of windings of the set of windings 116*a*, 116*b*, 116*c* to the ability of the respective current sensors of the set of current sensors to measure a current being supplied to the respective group of windings of the set of windings 116*a*, 116*b*, 116*c*. Put another way, the first current sensor 134*a* is configured to measure a current being supplied to the first group of windings 116*a*, the second current sensor 134*b* is configured to measure a current being supplied to the second group of windings 116*b*, and the third current sensor 134*c* is configured to measure a current being supplied to the third group of windings 116*c*.

The controller module 124 includes a processor 126 and a memory 128. The memory 128 includes a set of executable commands or runtime instructions, and the processor 126 is configured to execute the executable commands or otherwise provide the runtime instructions to other portions of the HTS 10. The controller module 124 can be configured to automatically control the operation of the HTS 10 and the electric machine 100. As a non-limiting example, the controller module 124 can be coupled to the voltage sensor 136, the set of current sensors, the electric machine clutch 118, the supply of electrical power 130 or a combination thereof.

The PEC 125 can receive communications from a controller of the gas turbine engine 14 exterior the HTS 10 and PEC 125. As a non-limiting example, the PEC 125 can be communicatively coupled to a FADEC of the gas turbine engine. It will be appreciated that the PEC 125 is separate from the FADEC or other controllers of the gas turbine engine 14. Put another way, the PEC 125 controls the operation of the HTS 10, specifically at least the electric machine 100, independent of the FADEC or other controllers of the gas turbine engine 14. The benefit of separating the PEC 125 from the other controllers of the gas turbine engine 14 is that the HTS 10 is formed as a modular unit. As the HTS 10 is a modular unit that includes an integral control unit/system (e.g., the PEC 125), the HTS 10 can be coupled to or otherwise retrofit to an existing turbine engine 14.

It will be appreciated that the PEC 125 can include other components exterior the HTS 10. As a non-limiting example, the gas turbine engine 14 can include one or more sensors (not illustrated) that the controller module 124 is coupled to. As a non-limiting example, the one or more sensors can include a set of temperature sensors configured to measure a temperature of at least one of the low-pressure compression section 19 (FIG. 1), the high-pressure compression section 18 (FIG. 1), the combustion section 20 (FIG. 1), the high-pressure turbine section 22 (FIG. 1), the low-pressure turbine section 24 (FIG. 1), or a combination thereof. Specific uses of the PEC 125 will be described in further detail in relation to FIGS. 3-8.

It will be appreciated that the PEC 125 comprises a set of electrical connections and a set of communication connections. The set of electrical connections are illustrated as solid lines leading from or to the PEC 125. The set of electrical connections are physical wires configured to convey an electrical power through the set of electrical connections. As a non-limiting example, the PEC 125 is connected to the set of windings 116*a*, 116*b*, 116*c*, the supply of electrical power 130, and the clutch actuator 122 through the set of electrical connections such that the PEC 125 is configured to receive electrical power from or supply electrical power to the supply of electrical power 130, the set of windings 116*a*, 116*b*, 116*c*, and the clutch actuator 122. The set of communication connections are illustrated in phantom lines leading from or to the PEC 125. The set of communication connections are defined as physical or over-the-air connections configured to convey information (e.g., signals) to and/or from the PEC 125. As a non-limiting example, the set of current sensors and the voltage sensor 136 are coupled to the PEC 125 via the set of communication connections.

The electric machine 100 is axially forward of the turbine member 38. That is, the turbine member 38 is axially aft of the electric machine 100.

During operation, the PEC 125 selectively supplies the supply of electrical power 130 to one or more portions of the electric machine 100. Specifically, the PEC 125 selectively supplies the electrical power from the supply of electrical power 130 to the set of windings 116*a*, 116*b*, 116*c*. The PEC 125 can further selectively supply the electrical power from the supply of electrical power 130 to the electric machine clutch 118.

The supply of the electrical power to the set of windings 116*a*, 116*b*, 116*c* causes the set of windings 116*a*, 116*b*, 116*c* to generate a magnetic field quantified by a magnetic flux. The magnetic flux generated by the set of windings 116*a*, 116*b*, 116*c* ultimately causes rotation of the rotor 104. Rotation of the rotor 104 causes rotation of the electric machine drive shaft 108.

The supply of the electrical power 130 can be coupled to the electric machine clutch 118, specifically the clutch actuator 122, to cause the clutch actuator 122 to move the engagement body 120 from a disengaged position, as illustrated, to an engaged position. The disengaged position is defined as a positioning of the electric machine clutch 118 where the engagement body 120 does not contact the respective portion of the HTS 10 exterior the electric machine 100. As such, when in the disengaged position, a torque from the electric machine drive shaft 108 is not transferred to another portion of the HTS 10 (e.g., the turbine shaft 40). The engaged position is defined as a positioning of the electric machine clutch 118 where the engagement body 120 does contact a respective portion of the HTS 10 exterior the electric machine 100. As such, when in the engaged position, the torque from the electric machine drive shaft 108 is transferred to another portion of the HTS 10 (e.g., the turbine shaft 40).

When the set of windings 116*a*, 116*b*, 116*c* are energized (e.g., the PEC 125 selectively supplies the electrical energy to the set of windings 116*a*, 116*b*, 116*c*), and the electric machine clutch 118 is engaged with the turbine shaft 40, the torque of the electric machine drive shaft 108 is transferred to the turbine shaft 40. Put another way, the electric machine drive shaft 108 drives the turbine shaft 40 when the electric machine clutch 118 is engaged. Rotation of the turbine shaft 40 can ultimately cause rotation of the output shaft 78. The output shaft 78 can be selectively coupled to (e.g. through electric machine clutch a decoupling device or additional electric machine clutch) to a portion of the gas turbine engine 14 such that the HTS 10 can effectively drive the portion of the gas turbine engine 14 (FIG. 1). Specifically, the output shaft 78 can be selectively coupled to the engine drive shaft 80 (FIG. 1) such that rotation of the output shaft 78 rotationally drives at least a portion of the fan 16 (FIG. 1), the low-pressure compression section 19, the high-pressure compression section 18, the high-pressure turbine section 22, the low-pressure turbine section 24, or a combination thereof. As such, when the set of windings 116*a*, 116*b*, 116*c* are energized and the electric machine clutch 118 is in the engaged position, the HTS 10 can drive at least a portion of the engine drive shaft 80 and cause rotation of at least one of the fan 16, the low-pressure compression section 19, the high-pressure compression section 18, the high-pressure turbine section 22, the low-pressure turbine section 24, or a combination thereof.

During operation, the PEC 125, specifically the controller module 124, receives a direct current (DC) voltage value from the voltage sensor 136 and a current signal from at least one current sensor of the set of current sensors 134*a*, 134*b*, 134*c*. The DC voltage value is indicative of a voltage value (e.g., Volts) attributed to the electrical power from the supply of electrical power 130. The current signal is indicative of a current value (e.g., Amps) being supplied to the set of windings 116*a*, 116*b*, 116*c*. Specifically, the current signal from the first current sensor 134*a* is indicative of the current value being supplied to the first group of windings 116*a*, the current signal from the second current sensor 134*b* is indicative of the current value being supplied to the second group of windings 116*b*, and the current signal from the third current sensor 134*c* is indicative of the current value being supplied to the third group of windings 116*c*. The use of the DC voltage value and the current signal will be described in further detail in relation to FIGS. 7 and 8. In general, it will be appreciated that the DC voltage value and the current signal are used to form a closed-loop system for the PEC 125 to control the operation of the electric machine 100.

The electric machine 100 can be used during various cycles of operation of the gas turbine engine 14 (FIG. 1). Specifically, the HTS 10 can be used during a startup process, a restart process, a maintenance procedure, or a thermal bow motoring process of the gas turbine engine 14.

During the startup process, pressurized air is fed through the primary airflow path 36 causing rotation of the turbine member 38. Rotation of the turbine member 38 causes rotation of the turbine shaft 40, which ultimately causes rotation of the output shaft 78. Rotation of the output shaft 78 causes rotation of the engine drive shaft 80 when the output shaft 78 is coupled to the engine drive shaft 80. During the startup process, the engine drive shaft 80 is rotated at a startup process speed. The startup process speed is a maximum speed that the engine drive shaft 80 reaches during the startup process when the output shaft 78 is driving the engine drive shaft 80. The startup process speed is generally greater than or equal to 7000 RPM and less than or equal to 10000 RPM.

During the startup process, the electric machine 100 can be turned on (e.g., the electrical power is supplied to the set of windings 116*a*, 116*b*, 116*c*) such that the electric machine drive shaft 108 rotates about the rotational axis 110 and is engaged with the turbine shaft 40. As such, the torque generated by the electric machine 100 is transferred to the turbine shaft 40, and ultimately to the output shaft 78 and the engine drive shaft 80. The use of the electric machine 100 during the startup process increases a torque output from the output shaft 78 in relation to a scenario where only the rotation of the turbine member 38 through use of the pressurized air is used. Further, the use of the electric machine 100 during the startup process can be used to overcome the peak forces on the gas turbine engine 14 (e.g., forces against rotation of the engine drive shaft 80) that are experienced during the startup procedure. For example, when the combustion section 20 is supplied fuel for ignition within the combustion section 20, drag forces against rotation of the engine drive shaft 80 peak. During this period, the electric machine 100 can be used to augment the speed at which the output shaft 78, and hence the engine drive shaft 80, rotates at in order to alleviate the effects of the peak forces. Put another way, the use of the electric machine 100 allows for the engine drive shaft 80 to overcome the peak forces while maintaining a constant or near-constant rotational speed.

Optionally, during an alternative startup process the gas turbine engine 14 is located on the ground or in the air (e.g., during flight of the aircraft), however pressurized air is unavailable to the HTS 10. During the alternative startup process, the electric machine 100 can be turned on to generate torque on the output shaft 78 in order to rotate one or more portions of the gas turbine engine 14 at the startup speed, allowing for a startup of the gas turbine engine 14. The alternate startup process can be done in place of the aforementioned startup process or during the restart process. As used herein, "restart" of the gas turbine engine 14 refers to an instance where the gas turbine engine 14 has ceased to drive at least one of the fan 16, the low-pressure compression section 19, the high-pressure compression section 18, the high-pressure turbine section 22, the low-pressure turbine section 24, or a combination thereof through combustion of a fuel within the combustion section 20 (FIG. 1) and cannot do so without a restart or a refiring of the gas turbine engine 14. During the restart process, the HTS 10 causes the engine drive shaft 80 to rotate at a restart process speed. The restart process speed is a maximum speed that the engine drive shaft 80 reaches during the restart process when the output shaft 78 is driving the engine drive shaft 80. The restart process speed is generally greater than or equal to 7500 RPM and less than or equal to 8500 RPM.

During the maintenance procedure, the electric machine 100 can be used without use of the pressurized air within the primary airflow path 36. During the maintenance procedure, the HTS 10 can supply a torque to the engine drive shaft 80 to cause the engine drive shaft to rotate at a maintenance procedure speed. The maintenance procedure speed is greater than 0 RPM and less than or equal to 180 RPM. It will be appreciated that during some portions of the maintenance procedures, the HTS 10 can selectively cease rotation of the engine drive shaft 80 such that the maintenance procedure speed temporarily is 0 RPM. It will be appreciated that the maintenance procedure, as used herein, can include multiple different procedures. As a non-limiting example, the maintenance procedure can be a wash procedure or an inspection procedure.

During the wash procedure, a foam or other cleaning agent can be supplied to various portions of the gas turbine engine 14, specifically at least one of the fan 16, low-pressure compression section 19, the high-pressure compression section 18, the high-pressure turbine section 22, and the low-pressure turbine section 24, or a combination thereof. The HTS 10, during the wash procedure, can rotate the engine drive shaft 80 at the maintenance procedure speed to cause the various portions of the gas turbine engine 14 to be coated with, or otherwise be cleaned by the foam or other cleaning agent.

During the inspection procedure, a tool (e.g., a borescope) can be utilized to visually inspect one more portions of the gas turbine engine 14. As a non-limiting example, the gas turbine engine 14 can include a plurality of rotatable blades within the fan 16, low-pressure compression section 19, the high-pressure compression section 18, the high-pressure turbine section 22, and the low-pressure turbine section 24). The borescope can be used to visually inspect the plurality of rotatable blades to determine if any one or more blades of the plurality of rotatable blades is in need for repair. Further, during the maintenance procedure the borescope or other tools can be utilized to perform the maintenance itself (e.g., perform the repair). The rotation of the engine drive shaft 80 at the maintenance procedure speed allows for movement circumferentially between blades of the plurality of rotatable blades without moving the borescope or other tool itself. The rotation of the engine drive shaft 80 at the maintenance procedure speed further allows for sufficient time to inspect each blade of the plurality of rotatable blades before moving onto a next circumferentially adjacent blade of the plurality of rotatable blades. Put another way, the maintenance speed can reach 0 RPM once the borescope or tool is aligned with a given blade of the plurality of rotatable blades for a period of time that is sufficient to allow for inspection of, repair of, or a combination thereof of the given blade.

During the thermal bow motoring process, the electric machine 100 can be used without use of the pressurized air within the primary airflow path 36. During the thermal bow motoring process, the HTS 10 provides a torque to the engine drive shaft 80 via the operation of the electric machine 100 to cause the engine drive shaft 80 to rotate at a thermal bow motoring process speed. The thermal bow motoring process speed is lower than the startup process speed. It will be appreciated that during the thermal bow motoring procedure, the engine drive shaft 80 rotates at an ultra-slow speed. The ultra-slow speed of the engine drive shaft 80 is greater than or equal to 0.5 RPM and less than or equal to 5 RPM.

The thermal bow motoring process is referred to as rotisserie mode of operation of the gas turbine engine 14. The rotisserie mode of operation occurs at a time between the shutdown process and a subsequent startup process (e.g., after the gas turbine engine 14 shuts down and before the gas turbine engine 14 is started up again). During the rotisserie mode of operation, the HTS 10 ensures that rotating portions of the gas turbine engine 14 do not become bowed or deformed. Specifically, if the rotating portions of the gas turbine engine 14 (e.g., the engine drive shaft 80) are not rotated after the shutdown process, they can become bowed or deformed. The phenomenon of the rotating portions of the gas turbine engine 14 bowing is often referred to as thermal bowing. Rotating the engine drive shaft 80 at the thermal bow motoring process speed between the shutdown process and the startup process ensures that the rotating portions of the gas turbine engine 14 do not become disformed or bowed.

It is contemplated that the thermal bow motoring process can occur continuously between the shutdown process and the subsequent startup process. It is contemplated that the thermal bow motoring process can occur for a period of time (e.g., between and including 4 hours and 12 hours) after the shutdown process, the startup process, or both the shutdown process and the startup process. This process (e.g., the rotisserie mode of operation) will be described in further detail in relation to FIGS. 3-8.

It is contemplated that the electric machine 100 can be used during other functions of the gas turbine engine 14. As a non-limiting example, in some cases the electric machine 100 can be turned on to supply a flow of cooling air through a respective portion of the gas turbine engine 14. As a non-limiting example, the HTS 10 can be used to selectively drive the engine drive shaft 80, as described herein, after shutdown. The rotation of the engine drive shaft 80 at this time is used to draw in ambient air through the fan 16 and subsequently into the low-pressure compression section 19, the high-pressure compression section 18, the combustion section 20, the high-pressure turbine section 22, the low-pressure turbine section 24. It is contemplated that the ambient air (e.g., the cooling air) that flows through the gas turbine engine 14 after shutdown of the gas turbine engine 14 helps provide a continuous flow of cooling air to one or more components of the gas turbine engine 14 that can require cooling after shutdown of the gas turbine engine 14.

It is important to note that the HTS 10 is different from an Air Turbine Starter (ATS) or an Engine Turning System (ETS). Specifically, the ATS works by rotating a turbine member (e.g., the turbine member 38) through use of a pressurized airflow flowing through a primary airflow path (e.g., the primary airflow path 36). The ATS is configured to rotate an output shaft (e.g., the output shaft 78) of the ATS at speeds of greater than 0 RPM and less than or equal to 8500 RPM. The ETS is electric only. Specifically, the ETS works by using an electric machine (e.g., the electric machine 100) to rotate an output shaft (e.g., the output shaft 78) of the ETS at speeds of greater than or equal to 0.1 RPM and less than or equal to 10 RPM. In comparison to one another, the ATS can cause the output shaft of the ATS to rotate much faster than speeds than the ETS can cause the output shaft of the ETS to rotate at. In order for the ETS to rotate at the startup speeds, a gearbox can be included. The gearbox, however, increases the overall weight, cost and footprint of the ETS.

The HTS 10, as described herein, includes the turbine member 38 and the primary airflow path 36. As such, the HTS 10 is configured to rotate the output shaft 78 at speeds of up to 8500 RPM. It will be appreciated, however, that these speeds are only possible when pressurized air is fed through the primary airflow path 36. The HTS 10, however, can augment the rotation of the output shaft 78 when the turbine member 38 is being rotated through use of the pressurized air in order to achieve a more refined control. Specifically, the pressurized air can cause rotation of the turbine member 38 (e.g., the unrefined control of the HTS 10). The electric machine 100, while the pressurized air causes rotation of the turbine member 38, can transfer a torque to the turbine shaft 40 (e.g., through control of the electric machine 100) to either add to or subtract from the speed of the output shaft 78 and cause the output shaft 78 to rotate at within a speed range that the ETS would be unable to rotate the output shaft 78 at (e.g., between 10 RPM and 8500 RPM). It is contemplated that operating the HTS 10 to rotate at speeds of up to 8500 RPM allow the HTS 10 to be used for certain operations of the gas turbine engine 14 such as the startup procedure.

For example, the electric machine 100 can cause the electric machine drive shaft 108 to rotate with (e.g., in the same circumferential direction as) the turbine shaft 40 such that the torque of transferred from the machine drive shaft 108 to the turbine shaft 40 adds on to the overall torque (e.g., speed) of the output shaft 78. For example, the electric machine 100 can cause the electric machine drive shaft 108 to rotate counter (e.g., in the opposite circumferential direction as) the turbine shaft 40 such that the torque of transferred from the machine drive shaft 108 to the turbine shaft 40 subtracts on to the overall torque (e.g., speed) of the output shaft 78. As such, the electric machine 100, through rotation of the electric machine drive shaft 108, can control the speed at which the output shaft 78 while the HTS 10 operates pneumatically (e.g., the pressurized air is fed through the primary airflow path 36). It will be appreciated that the use of the electric machine 100 during pneumatic operation of the HTS 10 allows for a more refined control of the HTS 10 when operating at higher speeds (e.g., at speeds that the ATS operates at).

The HTS 10 is configured to rotate the engine drive shaft 80 within a region of between and including 0 RPM and 650 RPM, hereinafter referred to as the "electric rotation region". Rotation of the engine drive shaft within the electric rotation region can be done through use of the electric machine 100 alone. Put another way, rotation of the output shaft 78 within the electric rotation region can be done without pneumatic operation of the HTS 10. It will be appreciated that within the electric rotation region, that the HTS 10 has a refined control similar to the refined control of the ETS. Put another way, when the HTS 10 utilizes only the electric machine 100 to rotate the output shaft 78, exact speeds of the output shaft 78 within the electric rotation region can be achieved.

It is contemplated that achieving exact speeds within the electric rotation region allow the HTS 10 to be used for certain operations of the gas turbine engine 14 such as the restart process, the thermal bow motoring procedure, and the maintenance procedure(s). For the thermal bow motoring procedure, the electric machine 100 is able to rotate the output shaft 78 at ultra-slow speeds, as described herein, to prevent or otherwise mitigate the effects of thermal bowing. For the maintenance procedures, the electric machine 100 is able to rotate the output shaft at slow speeds within the electric rotation region to cause a foam or other cleaning agent to flow through various portions of the gas turbine engine 14. For the maintenance procedure being the inspection procedure, the HTS 10 can, in some cases, rotate the output shaft 78 at the ultra-slow speed for a given period of time and then go to 0 RPM (e.g., stopped). The selective rotation and stopping of the output shaft 78 allows for the selective inspection of various rotating portions of the gas turbine engine 14 without need for moving the borescope, as described herein.

It will be appreciated that in some instances, the electric rotation region can reach upwards of 8500 RPM. Specifically, during the restart process, the HTS 10 can cause the engine drive shaft 80 to rotate up to 8500 RPM.

In summary, the HTS 10 can cause rotation of the output shaft 78 at speeds of greater than or equal to 0 RPM and less than or equal to 8500 RPM. Within the electric rotation region (e.g., between and including 0 RPM and 650 RPM), the HTS 10 has a refined control of the speed of the output shaft 78, like the ETS. Outside of the electric rotation region (e.g., greater than 650 RPM and less than or equal to 8500 RPM), the HTS 10 has a less refined control of the speed of the output shaft 78 than when in the electric rotation region. However, as the electric machine 100 can augment the rotation of the output shaft 78, the HTS 10 has a more refined control of the speed of the output shaft 78 outside of the electric rotation region in comparison to the control of the speed of the output shaft 78 for the ATS (e.g., pneumatic operation alone).

Figure 3:
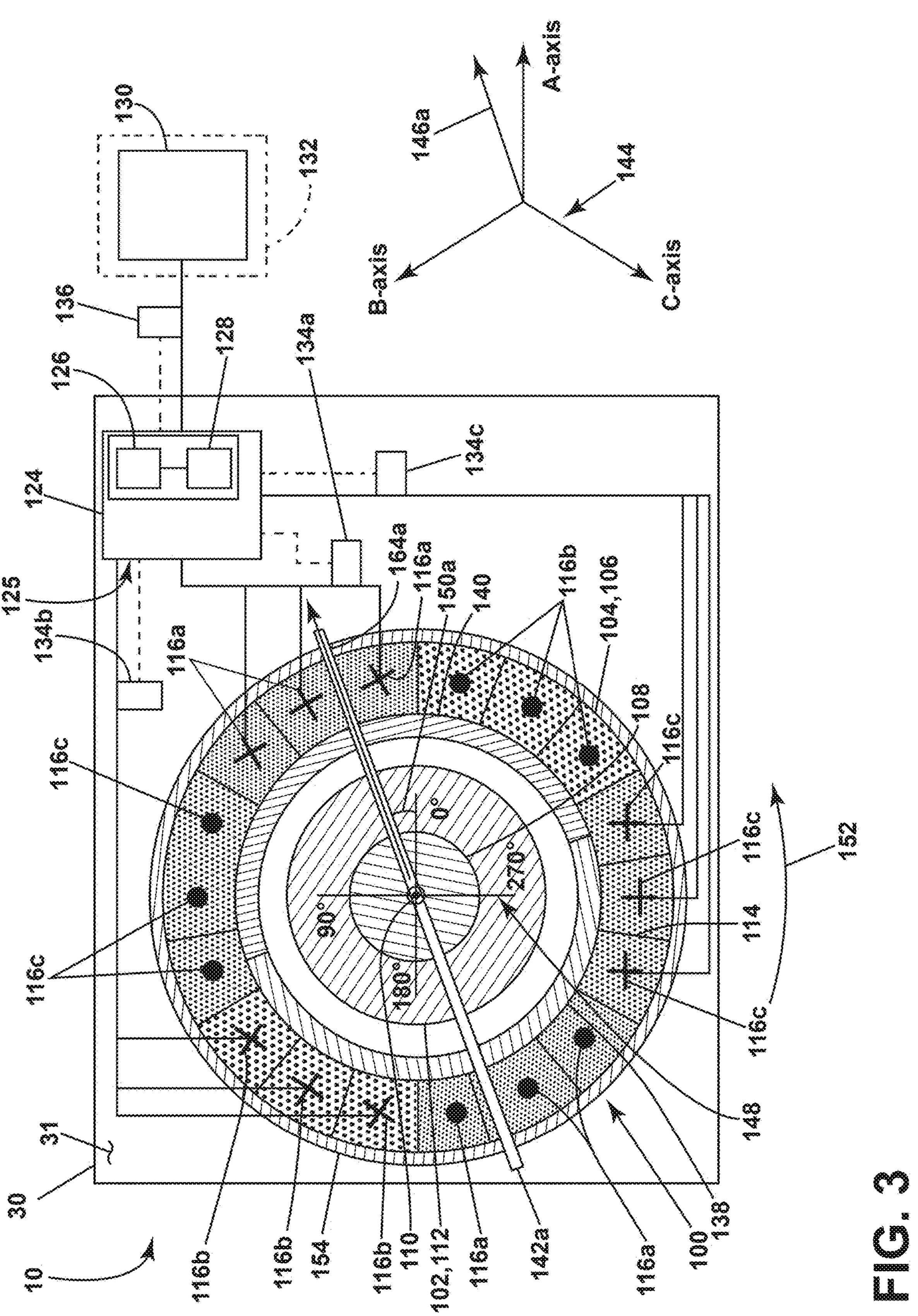
FIG. 3 is a schematic cross-sectional view of a portion of the hybrid turbine starter as seen from sectional line III-III of FIG. 2, further illustrating a rotor and a stator of the electric machine, with the rotor being positioned in a first rotational position based on a first electrical pulses in accordance with various aspects described herein.

FIG. 3 is a schematic cross-sectional view of a portion of the HTS 10 as seen from sectional line III-III of FIG. 2. It will be appreciated that FIG. 3 is a schematic representation of HTS 10. As such, various components (e.g., the primary airflow path 36 of FIG. 1) are not illustrated while other components (e.g., the housing 30) are shown as general structures or otherwise in phantom lines.

The HTS 10 includes the housing 30 defining the interior 31. The HTS 10 includes the electric machine 100 and the PEC 125. The electric machine 100 includes the stator 102, the rotor 104, and the electric machine drive shaft 108. The electric machine drive shaft 108 and the rotor 104 are rotatable about the rotational axis 110. The rotor 104 includes the rotor core 106. The stator 102 includes the stator core 112, the set of slots 114, and the set of windings 116*a*, 116*b*, 116*c*. The set of windings 116*a*, 116*b*, 116*c* include the first group of windings 116*a*, the second group of windings 116*b*, and the third group of windings 116*c*. The electric machine 100 comprises the electric machine housing 154.

The PEC 125 includes the controller module 124, the set of current sensors 136*a*, 136*b*, 136*c*, and the voltage sensor 136. The set of current sensors 134*a*, 134*b*, 134*c* include the first current sensor 136*a*, the second current sensor 136*b*, and the third current sensor 136*c*. The controller module 124 includes the processor 126 and the memory 128. The supply of electrical power 130 is located within the electrical power environment 132.

The electric machine 100, specifically the rotor, includes a polarity distinguished by a first polarity 138 and a second polarity 140. The first polarity 138 is opposite the second polarity 140. For purposes of discussion, the first polarity 138 is a positive polarity while the second polarity 140 is a negative polarity. An orientation of the first polarity 138 and the second polarity 140 is defined by a rotor magnetic orientation. In the present example, the first polarity 138 and the second polarity 140 are oriented to define a first rotor magnetic orientation 142*a*.

The first group of windings 116*a* form the first phase of the electric machine 100. The first phase is denoted by an array of small circles within the respective slots of the set of slots 114 that the first group of windings 116*a* extend through. The second group of windings 116*b* form the second phase of the electric machine 100. The second phase is denoted by an array of large circles within the respective slots of the set of slots 114 that the second group of windings 116*b* extend through. The third group of windings 116*c* form the third phase of the electric machine 100. The third phase is denoted by an array of medium circles within the respective slots of the set of slots 114 that the third group of windings 116*c* extend through.

The three phases of the electric machine 100 are represented by a three-phase diagram 144. The "A-axis" corresponds to the first phase (e.g., the first group of windings 116*a*). The "B-axis" corresponds to the second phase (e.g., the second group of windings 116*b*). The "C-axis" corresponds to the third phase (e.g., the third group of windings 116*c*).

During operation, the PEC 125 selectively supplies the electrical power from the supply of electrical power 130 to the set of windings 116*a*, 116*b*, 116*c*. It is contemplated that that PEC 125 can unevenly distribute the electrical power to the set of windings 116*a*, 116*b*, 116*c* to form a first electrical pulse 146*a*. The first electrical pulse 146*a*, as illustrated, is located within a space adjoining the A-axis and the B-axis on the three-phase diagram 144. The first electrical pulse 146*a* is formed to have this orientation by supplying a first amount of current to the first group of windings 116*a*, a second amount of current to the second group of windings 116*b*, and a third amount of current to the third group of windings 116*c*. The first amount of current for the first electrical pulse 146*a* is greater than the second amount of current, which is greater than the third amount of current.

The first electrical pulse 146*a* causes the stator 102 to form a first stator magnetic orientation 164*a*. The first stator magnetic orientation 164*a* corresponds to an orientation of the first electrical pulse 146*a* on the three-phase diagram 144. The first stator magnetic orientation 164*a* is defined by a first orientation angle 150*a*. The first orientation angle 150*a* is measured along a polar coordinate system 148 that remains constant along the foregoing description of a movement of the rotor 104. As illustrated, the first orientation angle 150*a* is within an area between 0° and 90°. The relationship between the stator magnetic orientation and the rotor magnetic orientation will be described in further detail below in relation to FIGS. 3 and 4.

Figure 4:
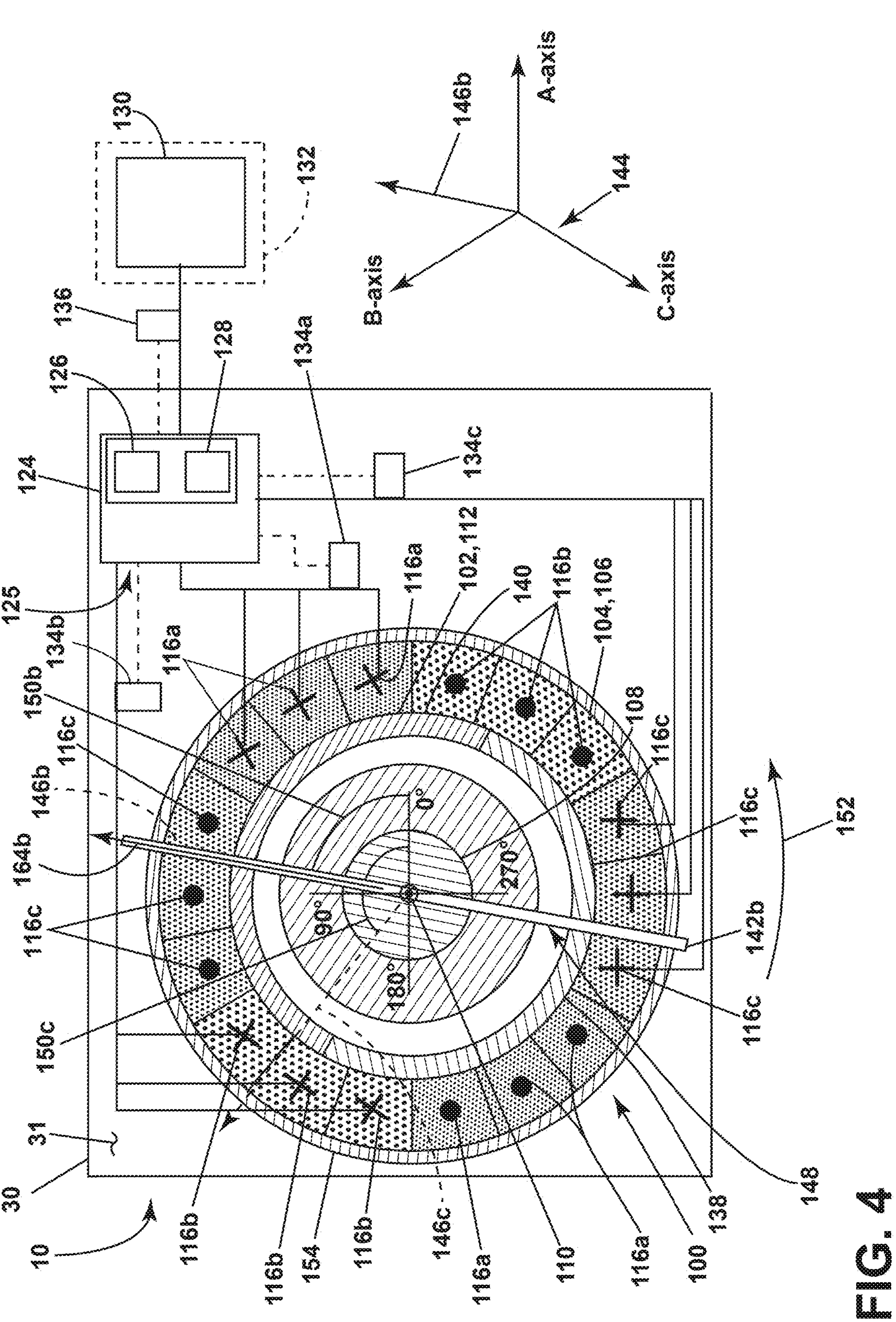
FIG. 4 is a schematic cross-sectional view of a portion of the hybrid turbine starter as seen from sectional line III-III of FIG. 2, further illustrating a rotor and a stator of the electric machine, with the rotor being positioned in a second rotational position based on a second electrical pulse in accordance with various aspects described herein.

FIG. 4 is a schematic cross-sectional view of a portion of the HTS 10 as seen from sectional line III-III of FIG. 2. It will be appreciated that FIG. 4 is a schematic representation of HTS 10. As such, various components (e.g., the primary airflow path 36 of FIG. 1) are not illustrated while other components (e.g., the housing 30) are shown as general structures or otherwise in phantom lines.

The HTS 10 includes the housing 30 defining the interior 31. The HTS 10 includes the electric machine 100 and the PEC 125. The electric machine 100 includes the stator 102, the rotor 104, and the electric machine drive shaft 108. The electric machine drive shaft 108 and the rotor 104 are rotatable about the rotational axis 110. The rotor 104 includes the rotor core 106. The stator 102 includes the stator core 112, the set of slots 114, and the set of windings 116*a*, 116*b*, 116*c*. The set of windings 116*a*, 116*b*, 116*c* include the first group of windings 116*a*, the second group of windings 116*b*, and the third group of windings 116*c*. The electric machine 100 comprises the electric machine housing 154.

The PEC 125 includes the controller module 124, the set of current sensors 134*a*, 134*b*, 134*c*, and the voltage sensor 136. The set of current sensors 134*a*, 134*b*, 134*c* include the first current sensor 136*a*, the second current sensor 136*b*, and the third current sensor 136*c*. The controller module 124 includes the processor 126 and the memory 128. The supply of electrical power 130 is located within the electrical power environment 132.

In the present example, the first polarity 138 and the second polarity 140 are oriented to define a second rotor magnetic orientation 142*b*. A movement of the magnetic rotor orientation (e.g., a movement of the first polarity 138 and the second polarity 140) will be described in further detail below.

During operation, the PEC 125 selectively supplies the electrical power from the supply of electrical power 130 to the set of windings 116*a*, 116*b*, 116*c*. It is contemplated that that PEC 125 can unevenly distribute the electrical power to the set of windings 116*a*, 116*b*, 116*c* to form a second electrical pulse 146*b*. The second electrical pulse 146*b*, as illustrated, is located within a space adjoining the A-axis and the B-axis on the three-phase diagram 144. The second electrical pulse 146*b* is formed to have this orientation by supplying a first amount of current to the first group of windings 116*a*, a second amount of current to the second group of windings 116*b*, and a third amount of current to the third group of windings 116*c*. The first amount of current for the first electrical pulse 146*a* is greater than the second amount of current, which is greater than the third amount of current.

The second electrical pulse 146*b* causes the stator 102 to form a second stator magnetic orientation 164*b*. The second stator magnetic orientation 164*b* corresponds to an orientation of the second electrical pulse 146*b* on the three-phase diagram 144. The second stator magnetic orientation 164*b* is defined by a second orientation angle 150*b*. The second orientation angle 150*b* measured along the polar coordinate system 148 is within an area between 0° and 90°.

With reference to FIGS. 3 and 4, the first orientation angle 150*a* is smaller than the second orientation angle 150*b*. Put another way, the second stator magnetic orientation 164*b* is spaced from the first stator magnetic orientation 164*a* in a common direction 152 circumferentially about the rotational axis 110. The common direction 152, as illustrated, is counter-clockwise. It will be appreciated, however, that the common direction 152 can be clockwise.

It will be appreciated that rotor magnetic orientation aligns with the current stator magnetic orientation. Put another way, if the first electrical pulse 146*a* is supplied to the set of windings 116*a*, 116*b*, 116*c*, the rotor magnetic orientation moves to the first rotor magnetic orientation 142*a* of FIG. 3 (e.g., aligns with the first stator magnetic orientation 164*a* of FIG. 3) to define a first rotational position (FIG. 3) of the rotor 104. If, after having been aligned in the first rotor magnetic orientation 142*a*, the PEC 125 selectively supplies the second electrical pulse 146*b* to the set of windings 116*a*, 116*b*, 116*c*, the stator magnetic orientation will change from the first stator magnetic orientation 164*a* to the second stator magnetic orientation 164*b* of FIG. 4 to define a second rotational position (FIG. 4) of the rotor 104. The change to the second stator magnetic orientation 164*b* causes the rotor magnetic orientation to move from the first rotor magnetic orientation 142*a* to the second rotor magnetic orientation 142*b*. The movement of the rotor magnetic orientation causes the rotor 104, as a whole, to move in the common direction 152 circumferentially about the rotational axis 110.

It will be appreciated that the PEC 125 can continuously supply electrical pulses to the electric machine 100 over a given time to form a sequence of electrical pulses. Each electrical pulse of the sequence of electrical pulses corresponding to a respective stator magnetic orientation that has a larger orientation angle than the last orientation angle of a previous electrical pulse of the sequence of electrical pulses (e.g., the second orientation angle 150*a* is greater than the second orientation angle 150*b*). A third orientation angle 150*c* defining a third stator magnetic orientation 164*c* is greater than the second orientation angle 150*b*.

It is contemplated that the voltage measured by the voltage sensor 136 of the electrical power from the supply of electrical power 130 is a function of the torque of the electric machine drive shaft 108. Specifically, torque is directly proportional to the current supplied to the set of windings 116*a*, 116*b*, 116*c*. The current is dictated, in part, by the voltage. As such, a correlation between the voltage and the output torque exists where a higher voltage from the supply of electrical power 130 equals a higher current, which ultimately equals a higher torque of the electric machine drive shaft 108. The torque is further a function of the voltage and a time that the respective pulse is applied to the set of windings 116*a*, 116*b*, 116*c*. Specifically, an electrical pulse over a 1 second time from a 800 Volt supply of electrical power 130 will result in the electric machine drive shaft 108 having a lower torque than if the electrical pulse is applied over 2 second time from the same 800 Volt supply of electrical power 130. The relationship between the sequence of electrical pulses and time will be described in further detail in relation to FIG. 7.

Figure 5:
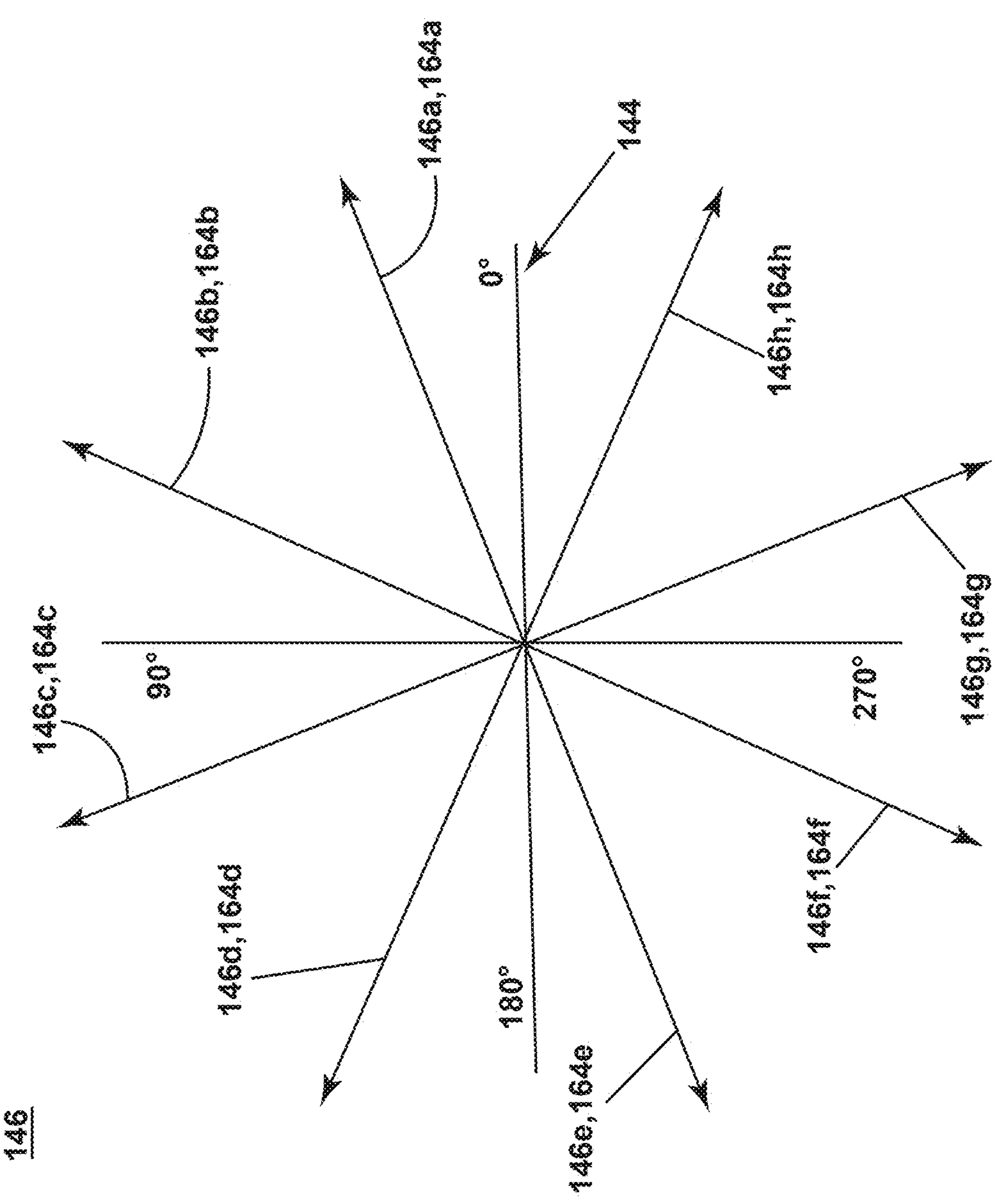
FIG. 5 is a schematic representation of a sequence of electrical pulses including the first electrical pulse of FIG. 3 and the second electrical pulse of FIG. 4, further illustrating the first electrical pulse, the second electrical pulse, a third electrical pulse, a fourth electrical pulse, a fifth electrical pulse, a sixth electrical pulse, a seventh electrical pulse, and an eighth electrical pulse in accordance with various aspects described herein.

FIG. 5 is a schematic representation of a sequence of electrical pulses 146 including the first electrical pulse 146*a* of FIG. 3 and the second electrical pulse 146*b* of FIG. 4. The sequence of electrical pulses 146, for clarity, are shown on the polar coordinate system 148. While illustrated as a single line, it will be understood that the line illustrated for each electrical pulse of the sequence of electrical pulses 146 is the general or average direction vector defining the electrical pulse, during, for example, a middle of the time interval that the electrical pulse is being supplied to the electric machine 100.

The sequence of electrical pulses 146 include any number of two or more electrical pulses. As a non-limiting example, the sequence of electrical pulses 146 include the first electrical pulse 146*a*, the second electrical pulse 146*b*, a third electrical pulse 146*c*, a fourth electrical pulse 146*d*, a fifth electrical pulse 146*e*, a sixth electrical pulse 146*f*, a seventh electrical pulse 146*g*, and an eighth electrical pulse 146*h*.

The first through eighth electrical pulse 146*a-h* can be evenly spaced from one another. Put another way, the first through eighth electrical pulse 146*a-h* can be evenly spaced over the 360° of the polar coordinate system 148. In terms of the sequence of electrical pulses 146 having eight electrical pulses, each electrical pulse of the sequence of electrical pulses can be spaced 45° from a previous electrical pulse of the sequence of electrical pulses 146. It will be appreciated that the sequence of electrical pulses 146 can include any number of two or more electrical pulses offset from one another. As a non-limiting example, the sequence of electrical pulses 146 can include four electrical pulses offset by 90°. As a non-limiting example, the sequence of electrical pulses can include thirty-six electrical pulses each offset by 10°.

It will be appreciated that the sequence of electrical pulses 146 are ordered in chronological order with no two electrical pulses of the sequence of electrical pulses 146 occurring at the same time. Each electrical pulse of the sequence of electrical pulses 146 moves sequentially further in the polar coordinate system 148 from the previous electrical pulse of the sequence of electrical pulses 146. It will be appreciated that the sequence of electrical pulses 146 can repeat or otherwise continue after reaching 360° on the polar coordinate system 148. Put another way, the sequence of electrical pulses 146 can include a ninth electrical pulse after the eighth electrical pulse 146*h*. The ninth electrical pulse can coincide with a location of where the first electrical pulse 146*a* is located on the polar coordinate system 148.

Each electrical pulse of the sequence of electrical pulses 146 defines a stator magnetic orientation. Specifically, the first electrical pulse 146*a* defines the first stator magnetic orientation 164*a*, the second electrical pulse 146*b* defines the second stator magnetic orientation 164*b*, the third electrical pulse 146*c* defines a third stator magnetic orientation 164*c*, the fourth electrical pulse 146*d* defines a fourth stator magnetic orientation 164*d*, the fifth electrical pulse 146*e* defines a fifth stator magnetic orientation 164*e*, the sixth electrical pulse 146*f* defines a sixth stator magnetic orientation 164*f*, the seventh electrical pulse 146*g* defines a seventh stator magnetic orientation 164*g*, and the eighth electrical pulse 146*h* defines an eighth stator magnetic orientation 164*h*.

With reference to FIGS. 3-5, the rotor magnetic orientation aligns with a current stator magnetic orientation based on the electrical pulse of the sequence of electrical pulses 146 that was most recently applied. Put another way, if the third electrical pulse 146*c* is applied (e.g., the second electrical pulse 146*b* was the previous electrical pulse in the sequence of electrical pulses 146), the stator magnetic orientation is moved from the second stator magnetic orientation 164*b* and to the third stator magnetic orientation 164*c*. The movement of the stator magnetic orientation causes the rotor magnetic orientation to move towards the current stator magnetic orientation (e.g., in the immediate example, the third stator magnetic orientation 164*c*).

The movement of the rotor magnetic orientation with the stator magnetic orientation (e.g., with the sequence of electrical pulses 146) causes movement of the rotor 104 in the common direction 152. Put another way, the sequence of electrical pulses 146 are applied to move the rotor 104 to define a sequence of rotational positions of the rotor 104 that move circumferentially about the rotation axis 110 in the common direction 152.

Between each electrical pulse of the sequence of electrical pulses 146, a wait time can occur where no further electrical pulses are applied. This wait time will be described in further detail in relation to FIG. 7, however, is generally defined as a time that it takes for the rotor magnetic axis to circumferentially align with the stator magnetic axis defined by the last applied electrical pulse of the sequence of electrical pulses 146. It will be appreciated that each revolution of the polar coordinate system 148 by the sequence of electrical pulses 146 equals a singular full revolution of the rotational axis 110 by the rotor 104 and the electric machine drive shaft 108. As such, if the PEC 125 is to rotate the rotor 104 two revolutions, the PEC 125 can selectively supply an electrical power from the supply of electrical power 130 in the form of the sequence of electrical pulses 146 in such a way that the sequence of electrical pulses 146 collectively form two full revolutions about the polar coordinate system 148. Put another way, the sequence of electrical pulses 146, specifically a total number of times that the sequence of electrical pulses 146 revolves 360° about the rotational axis, over a given time defines a rotational speed (e.g., revolutions per minute (RPM)) of the electric machine drive shaft 108.

Figure 6:
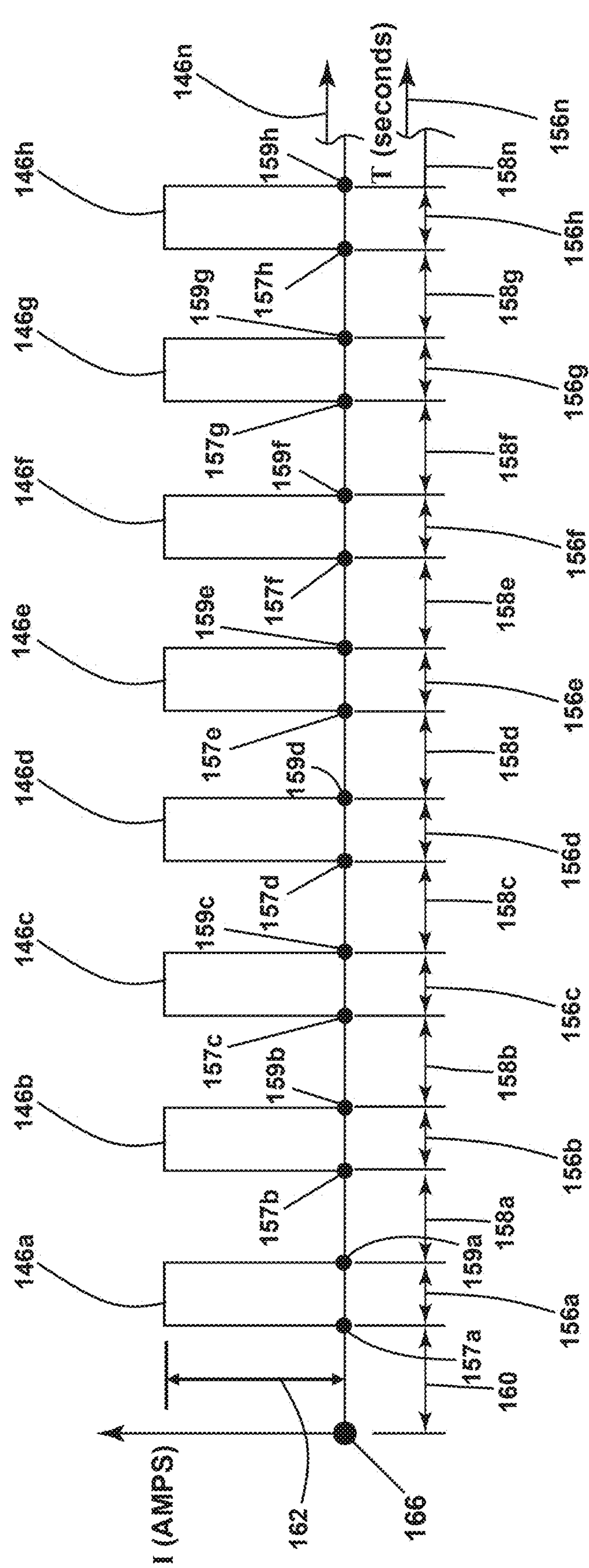
FIG. 6 is a graphical representation of the sequence of electrical pulses of FIG. 3 over a given wait time in accordance with various aspects described herein.

FIG. 6 is a graphical representation of the sequence of electrical pulses 146 of FIG. 3. The graphical representation illustrates a current (I) over a given time (T). The graphical representation is of the sequence of electrical pulses 146 after shutdown 166 of the gas turbine engine 14 (FIG. 1).

Each electrical pulse of the sequence of electrical pulses 146 is defined by a respective current amplitude 162. The current amplitude 162 is defined as a maximum value of a current supplied to the set of windings 116*a*, 116*b*, 116*c* during a given electrical pulse of the sequence of electrical pulses 146. The current amplitude 162, as illustrated, is constant between electrical pulses of the sequence of electrical pulses 146. It will be appreciated, however, that one or more electrical pulses of the sequence of electrical pulses 146 can have a higher or lower current amplitude 162 than another electrical pulse of the sequence of electrical pulses 146.

Each electrical pulse of the sequence of electrical pulses 146 starts or begins at a rise time and ends or ceases at a return time. A time that each electrical pulse of the sequence of electrical pulses 146 occurs is defined between the rise time and the return time of the respective electrical pulse.

The sequence of electrical pulses 146 includes any number of two or more electrical pulses. The sequence of electrical pulses 146 can include the first electrical pulse 146*a*, the second electrical pulse 146*b*, the third electrical pulse 146*c*, the fourth electrical pulse 146*d*, the fifth electrical pulse 146*e*, the sixth electrical pulse 146*f*, the seventh electrical pulse 146*g*, and the eighth electrical pulse 146*h*. The sequence of electrical pulses 146 can continue after the eighth electrical pulse to an $n^{th}$ electrical pulse 146*n*. The $n^{th}$ electrical pulse 146*n* is defined as a final electrical pulse of the sequence of electrical pulses 146.

The first electrical pulse 146*a* begins at a first rise time 157*a* and ends at a first return time 159*a*. The first rise time

157*a* and the first return time 159*a* are spaced apart over the time (T) a first timeframe 156*a*. The first timeframe 156*a* is a non-zero time.

The second electrical pulse 146*b* begins at a second rise time 157*b* and ends at a second return time 159*b*. The second rise time 157*b* and the second return time 159*b* are spaced apart over the time (T) a second timeframe 156*a*. The second timeframe 156*b* is a non-zero time.

The third electrical pulse 146*c* begins at a third rise time 157*c* and ends at a third return time 159*c*. The third rise time 157*c* and the third return time 159*c* are spaced apart over the time (T) a third timeframe 156*a*. The third timeframe 156*c* is a non-zero time.

The fourth electrical pulse 146*d* begins at a fourth rise time 157*d* and ends at a fourth return time 159*d*. The fourth rise time 157*d* and the fourth return time 159*d* are spaced apart over the time (T) a fourth timeframe 156*a*. The fourth timeframe 156*d* is a non-zero time.

The fifth electrical pulse 146*e* begins at a fifth rise time 157*e* and ends at a fifth return time 159*e*. The fifth rise time 157*e* and the fifth return time 159*e* are spaced apart over the time (T) a fifth timeframe 156*a*. The fifth timeframe 156*e* is a non-zero time.

The sixth electrical pulse 146*f* begins at a sixth rise time 157*f* and ends at a sixth return time 159*f*. The sixth rise time 157*f* and the sixth return time 159*f* are spaced apart over the time (T) a sixth timeframe 156*a*. The sixth timeframe 156*f* is a non-zero time.

The seventh electrical pulse 146*g* begins at a seventh rise time 157*g* and ends at a seventh return time 159*g*. The seventh rise time 157*g* and the seventh return time 159*g* are spaced apart over the time (T) a seventh timeframe 156*a*. The seventh timeframe 156*g* is a non-zero time.

The eighth electrical pulse 146*h* begins at a eighth rise time 157*h* and ends at a eighth return time 159*c*. The eighth rise time 157*h* and the eighth return time 159*h* are spaced apart over the time (T) an eighth timeframe 156*h*. The eighth timeframe 156*h* is a non-zero time.

Each $n^{th}$ electrical pulse 146*n* of the sequence of electrical pulses has a rise time and a return time. The time between the rise time and the return time of each $n^{th}$ electrical pulse 146*n* is an $n^{th}$ timeframe 156*n*.

The first through $n^{th}$ timeframe 156*a-h*, 156*n* are collectively referred to as the set of times. Each time of the set of times is a non-zero time. Each time of the set of times is greater than 0 seconds and less than or equal to 10 seconds.

Between successive electrical pulses of the sequence of electrical pulses 146, a wait time occurs. Specifically, between the return of a given electrical pulse of the sequence of electrical pulses 146 and a rise of the next electrical pulse in the sequence of electrical pulses 146 a wait time occurs. A first wait time 158*a* occurs between the first return time 159*a* and the second rise time 157*b*. A second wait time 158*b* occurs between the second return time 159*b* and the third rise time 157*c*. A third wait time 158*c* occurs between the third return time 159*c* and the fourth rise time 157*d*. A fourth wait time 158*d* occurs between the fourth return time 159*d* and the fifth rise time 157*e*. A fifth wait time 158*e* occurs between the fifth return time 159*e* and the sixth rise time 157*f*. A sixth wait time 158*f* occurs between the sixth return time 159*f* and the seventh rise time 157*g*. A seventh wait time 158*g* occurs between the seventh return time 159*g* and the eighth rise time 157*h*. It will be appreciated that between each $n^{th}$ electrical pulse 146*n*, a respective wait time occurs.

Each wait time between consecutive electrical pulses of the sequence of electrical pulses 146 is greater than 0 seconds. As a non-limiting example, each wait time between consecutive electrical pulses of the sequence of electrical pulses 146 is greater than 0 seconds and less than or equal to 100 seconds. Each wait time between consecutive electrical pulses of the sequence of electrical pulses 146 is a function between a desired rotational speed of the electric machine drive shaft 108 on a total number of pulses in the sequence of electrical pulses 146 that define a singular revolution of the rotor 104 (e.g., within a singular 360° revolution on the polar coordinate system 148). As a non-limiting example, if the desired rotational speed of the electric machine drive shaft 108 is 0.5 RPM and there are eight electrical pulses in the sequence of electrical pulses 146 per revolution about the polar coordinate system 148, each wait time is 15 seconds.

Each wait time of the set of wait times is further defined, at a minimum, as a time that it takes for the rotor magnetic orientation to move from a current rotor magnetic orientation (e.g., the first rotor magnetic orientation 142*a* of FIG. 3) to a next rotor magnetic orientation (e.g., the second rotor magnetic orientation 142*b* of FIG. 4). The time of the set of times that each electrical pulses of the sequence of electrical pulses 146 is supplied, along with the voltage value, as discussed herein, determines how fast the rotor 104 (FIG. 2) moves from the current rotor magnetic orientation to the next rotor magnetic orientation. As such, each wait time of the set of wait times is a function of the time of the set of times that produces the next rotor magnetic orientation and the voltage of the supply of electrical power 130.

While the current (I) is illustrated as being 0 amps between each pulse of the sequence of electrical pulses 146, it will be appreciated that this need not be the case. For example, a constant current can be supplied between successive pulses of the sequence of electrical pulses 146. Alternatively, no current can be supplied between successive pulses of the sequence of electrical pulses 146. It will be appreciated that the current supplied to the set of windings 116*a*, 116*b*, 116*c* during the set of timeframes 156*a-h* is greater than or equal to 0 amps and less than or equal to 5% of the current amplitude 162 of a previous electrical pulse of the sequence of electrical pulses 146 from a given wait time.

A shutdown time 160 can be provided between the time that the shutdown 166 occurs and when the first electrical pulse 146*a* of the sequence of electrical pulses 146 occurs. The shutdown time 160 can be a non-zero amount of time, as illustrated. Alternatively, the first electrical pulse 146*a* can occur in tandem with the shutdown 166. As a non-limiting example, the shutdown time 160 can be defined as the time that it takes for the gas turbine engine 14 (FIG. 1) to wind down to a predetermined RPM before the HTS 10 begins driving the gas turbine engine 14. As a non-limiting example, the shutdown time 160 can be defined as a time that it takes for the supply of electrical power 130 (FIGS. 2-4) to become available to the HTS 10 after shutdown 166 has occurred.

Figure 7:
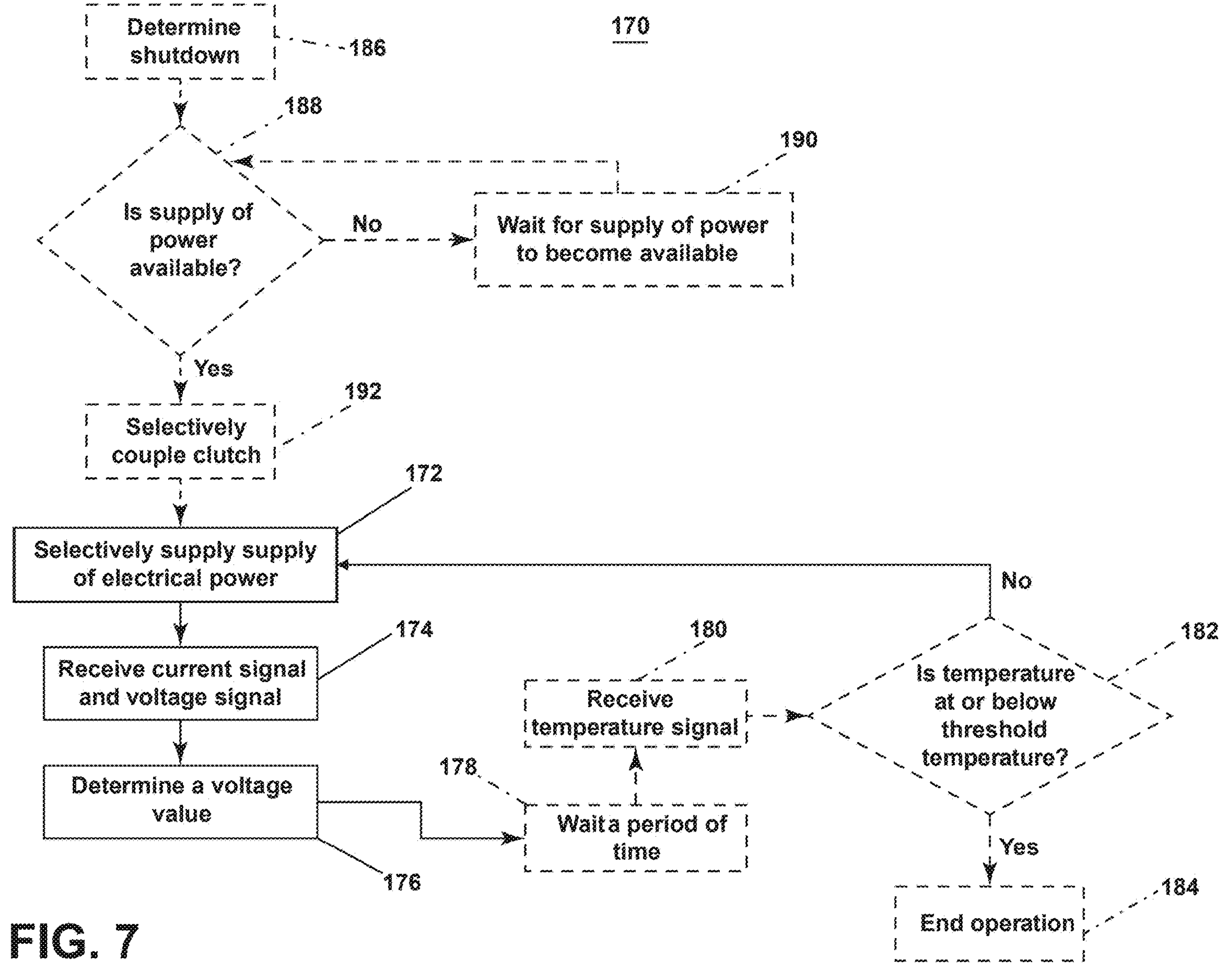
FIG. 7 is a flow diagram of a method of operating the hybrid turbine starter of FIG. 1, according to a mode of operation of the HTS, specifically a rotisserie mode of operation, in accordance with various aspects described herein.

FIG. 7 is a method 170 of operating the HTS 10 of FIG. 1 according to a mode of operation of the HTS 10. Specifically, the mode of operation illustrated is FIG. 7 is during a rotisserie mode of operation. During the rotisserie mode of operation, the thermal bow motoring procedure occurs. The method 170 includes selectively supplying at 172, via the PEC 125 (FIGS. 2-4), an electric pulse (e.g., the first electric pulse 146*a* of FIGS. 3-5) of the sequence of electric pulses 146 (FIGS. 3-6) from the supply of electrical power 130 (FIGS. 2-4) in the form of to the electric machine 100 (FIGS. 3-4). Specifically, the controller module 124 (FIGS. 2-4) of the PEC 125 can utilize the processor 126 (FIGS. 2-4) to send a command to a portion of the PEC 125 (e.g., a switch, gate, or the like) to selectively couple one or more electrical connections of the set of electrical connections together such that the electrical power from the supply of electrical power 130 is fed to the set of windings 116*a*, 116*b*, 116*c*.

It will be appreciated that the PEC 125, at 172, unevenly distributes the electrical power to the set of windings 116*a*, 116*b*, 116*c* in order to create the respective electrical pulse of the sequence of electrical pulses 146 as previously described in relation to FIGS. 3 and 4. The PEC 125, at 172, can access the memory 128 (FIGS. 2-4) to determine a previous electrical pulse of the sequence of electrical pulses 146 that was supplied to the electric machine 100. The memory 128 can include an order of the sequence of electrical pulses 146 and a current value for each that needs to be supplied to each group of windings (e.g., the first group of windings 116*a*, the second group of windings 116*b*, and the third group of windings 116*c* of FIGS. 2-4) in order to create each respective electrical pulse. Once the PEC 125 determines what the previous electrical pulse was, the PEC 125 can determine which numbered electrical pulse in the sequence of electrical pulses needs to be supplied to the electric machine 100 next. For example, if the PEC 125 determines that the last electrical pulse was the first electrical pulse 146*a* (FIGS. 2 and 4-6), the PEC 125 can determine that the next electrical pulse will be the second electrical pulse 146*b* (FIGS. 3-6). If the PEC 125 determines that there was no previous electrical pulse, the PEC 125 can determine that the sequence of electrical pulses 146 has not yet started and selectively supply the first electrical pulse 146*a* from the supply of electrical power 130 to the electric machine 100.

The DC voltage value and the current signal are received at 174, by the PEC 125, from the voltage sensor 136 (FIGS. 2-4) and the set of current sensors (e.g., the first current sensor 136*a*, the second current sensor 136*b*, and the third current sensor 136*c* of FIGS. 2-4), respectively. Specifically, the controller module 124 receives the DC voltage value and the current signal, at 174. It will be appreciated that the DC voltage value and the current signal is received, at 174, during the time that the supply of electrical power 130 is supplied at 172. For example, the controller module 124 receives the DC voltage value and the current signal during the first timeframe 156*a* when the first electrical pulse 146*a* is supplied to the electric machine 100.

The PEC 125 determines, at 176, a voltage value required to create the next electrical pulse of the sequence of electrical pulses 146. Specifically, the PEC 125 determines, at 176, what voltage value needs to be supplied from the supply of electrical power 130 to the electric machine 100 to form the next electrical pulse of the sequence of electrical pulses in relation to the electrical pulse that was supplied, at 172, to the electric machine 100. As a non-limiting example, the PEC 125, at 176, determines that the first electrical pulse 146*a* was supplied, at 172, through measurement of the current signal and the DC voltage value, at 174. The PEC 125 can then determine, through for example access to a listing of the sequence of electrical pulses 146 available to the memory 128, what the voltage value from the supply of electrical power 130 needs to be in order to define the second electrical pulse 146*b*.

The voltage corresponds to the sequence of electrical pulses 146. Specifically, the voltage supplied to the electric machine 100 from the supply of electrical power 130 is selectively controlled on and off (e.g., selectively supplied) via the PEC 125. It is contemplated that during a given electrical pulse of the sequence of electrical pulses 146, the voltage is supplied to the electric machine 100 for a given period of time. During the given period of time, the PEC 125 can switch the voltage supplied on (being supplied to the electric machine 100) and off (not being supplied to the electric machine 100). The frequency that the voltage is turned on and off during the given electrical pulse and the total time that the voltage is supplied to the electric machine during the given electrical pulse determines the value (e.g., the current vector on the three phase diagram 144 of FIGS. 3 and 4) of given electrical pulse.

The PEC 125 determines the duration (e.g., the given period of time) that the voltage is supplied to the electric machine for the given electrical pulse by comparing a measured current value to a needed current value. When the voltage is supplied to the electric machine 100 as the current, the PEC 125 measures the current (e.g., through use of the set of current sensors 134*a*, 134*b*, 134*c* of FIG. 2) to define the measured current. The PEC 125 then accesses the memory 128 to determine the needed current value supplied to each winding of the set of windings 116*a*, 116*b*, 116*c* (FIG. 2) to define a respective electrical pulse of the sequence of electrical pulses 146. The PEC 125 compares the measured current to the needed current value to determine what voltage value is required to create the given electrical pulse of the sequence of electrical pulses 146.

The method 170 can further include determining a rotational position of the rotor 104 through use of the current signal and the DC voltage value received, at 174. Specifically, the controller module 124 determines, through use of the current signal and the DC voltage value received at 174, the rotational position of the rotor 104. Specifically, the controller module 124 determines through use of the current signal and the DC voltage value received, at 174, what the positioning of the rotor magnetic orientation will be once given the opportunity to align with the stator magnetic orientation that is formed by the electrical pulse of the sequence of electrical pulses 146 that is supplied at 172.

The method 170, specifically the selectively supplying, at 172, the receiving, at 174, and the determining, at 176, can be repeated for each successive electrical pulse of the sequence of electrical pulses 146. As an example, the controller module 124 can supply, at 172 and at the first timeframe 156*a*, the first electrical pulse 146*a* from the supply of electrical power 130. The first electrical pulse 146*a*, as discussed herein, defines the first stator magnetic orientation 164*a* (FIGS. 3 and 5). The first stator magnetic orientation 142*a* is offset from a current rotor magnetic orientation of the rotor 104. This causes the rotor magnetic orientation to align with the first stator magnetic orientation 164*a*, Put another way, the rotor magnetic orientation becomes the first rotor magnetic orientation 142*a* (FIG. 3). During the first electrical pulse 146*a*, the controller module 124 receives the DC voltage value and the current signal, at 174. The controller module 124 then determines at 176 what voltage value is required to create the next electrical pulse of the sequence of electrical pulses 146.

After the rotor magnetic orientation is aligned with the first stator magnetic orientation 164*a*, the method 170 repeats for the next electrical pulse of the sequence of electrical pulses 146 (e.g., the second electrical pulse 146*b*). The controller module 124 can supply, at 172 and at the second timeframe 156*b*, after the first timeframe 156*a*, supply the second electrical pulse 146*b* of electrical power 130. The second electrical pulse 146*b*, as discussed herein, defines the second stator magnetic orientation 164*b* (FIGS. 4 and 5). The second stator magnetic orientation 142*b* is offset from a current rotor magnetic orientation of the rotor 104 (e.g., now the first rotor magnetic orientation 142*a*).

This causes the rotor magnetic orientation to align with the second stator magnetic orientation 164*b*, Put another way, the rotor magnetic orientation becomes the second rotor magnetic orientation 142*b* (FIG. 4). During the second electrical pulse 146*b*, the controller module 124 receives the DC voltage value and the current signal, at 174. The controller module 124 then determines that the next electrical pulse of the sequence of electrical pulses is the second electrical pulse 146*b* and determines, at 176, what voltage value is required to create the second electrical pulse 146*b*. The aforementioned process is performed for each electrical pulses in the sequence of electrical pulses 146 all the way to the $n^{th}$ electrical pulse 146*n* (FIGS. 5 and 6).

It will be understood that the method 170 is flexible and the method 170 is illustrated merely for illustrative purposes. For example, the sequence of steps depicted is for illustrative purposes only and is not meant to limit the method 170 in any way, as it is understood that the steps can proceed in a different logical order or additional or intervening steps can be included without detracting from embodiments of the invention. It will be appreciated that the method 170 can include additional steps illustrated in phantom lines.

As a non-limiting example, the method 170 can include waiting a wait time (e.g., the first through $n^{th}$ wait time 158*a*-*g*, 158*n* of FIG. 6), at 178. The waiting occurs after the time where the electrical pulse of the sequence of electrical pulses 146 is selectively supplied, at 172, and before repeating the loop of 172, 174, and 176. Put another way, the first electrical pulse 146*a* is supplied at the first timeframe 156*a*. After the first timeframe 156*a* ends, the first wait time 158*a* starts and the method 170 waits the first wait time 158*a*, at 178. Once the first wait time 158*a* ends, the second timeframe 156*b* starts. During the second timeframe 156*b*, the second electrical pulse 146*b* is selectively supplied to the electric machine 100, at 172. It will be appreciated that other intervening steps can occur in tandem with the waiting of the wait time, at 178. As a non-limiting example, the determining, at 176, can occur during the waiting of the wait time, at 178.

Additional steps of the method 170 can occur during the waiting of the wait time, at 178, or otherwise during the time it takes for the method 170 to do one revolution of the steps 172, 174, 176 and 178 (e.g., a summation of a given time of the set of times and an following wait time of the set of wait times of FIG. 6). As a non-limiting example, the method 170 can include receiving a temperature signal indicative of a temperature of at least a portion of the gas turbine engine 14, at 180. The temperature signal is received from a temperature sensor, as discussed herein, that measures a temperature of at least one of the fan 16 (FIG. 1), the low-pressure compression section 19 (FIG. 1), the high-pressure compression section 18 (FIG. 1), the high-pressure turbine section 22 (FIG. 1), the low-pressure turbine section 24 (FIG. 1), or a combination thereof. As such, the PEC 125, specifically the controller module 124, can receive the temperature signal, at 180, and determine what the current temperature of at least one of the fan 16, the low-pressure compression section 19, the high-pressure compression section 18, the high-pressure turbine section 22, the low-pressure turbine section 24, or a combination thereof is.

With the temperature signal, the PEC 125 can compare, at 182, the temperature with a threshold temperature. The threshold temperature is defined as a predetermined temperature that the gas turbine engine 14 should be at after the shutdown 166 in order to prevent thermal bowing from occurring or otherwise when the gas turbine engine 14 no longer requires cooling. The threshold temperature, for example, is greater than 150 degrees Fahrenheit and less than or equal to 200 degrees Fahrenheit. The threshold temperature can be stored on the memory 128. If the comparison shows that the threshold temperature has not yet been reached, the method 170 repeats by going through the steps of at least 172, 174, and 176. The repeat of at least the steps 172, 174, 176 will continue to drive the engine drive shaft 80 (FIG. 1) to prevent thermal bowing and continue to flow a cooling airflow through the gas turbine engine 14, as described previously. The method 170 can continue to perform this comparison and a repeat of at least the steps 172, 174, and 176 until the temperature, indicated by the temperature signal received at 180, is less than or equal to the threshold temperature.

Once the temperature is less than or equal to the threshold temperature, the operation of the HTS 10 according to the method 170 can end, at 184. Put another way, if the threshold temperature is reached or is otherwise gone below, the HTS 10 can stop driving the engine drive shaft 80, at 184.

It will be appreciated that the end of operation, at 184, can be based on the temperature of the gas turbine engine 14. Alternatively, the end of the operation, at 184, can be based on an elapsed time or the sequence of electrical pulses 146. As a non-limiting example, the PEC 125 can include instructions (e.g., on the memory 128) to only drive the engine drive shaft 80 through the selectively supplying sequence of electrical pulses 146 the supply of electrical power 130 for a given timeframe. Once that given timeframe elapses, the end of operation can occur, at 184. As a non-limiting example, the PEC 125 can include instructions to only supply the electrical power from the supply of electrical power over a given number of electrical pulses of the sequence of electrical pulses 146. Once that given number of electrical pulses is reached, the end of operation can occur, at 184.

The method 170 can include determining, via the PEC 125, if the shutdown 166 has occurred, at 186. The determination of whether or not the shutdown 166 has occurred can be done by the controller module 124. As a non-limiting example, the PEC 125 can receive a communication from another engine controller that controls the operation of the gas turbine engine 14 that the shutdown 166 has occurred or is presently occurring. As a non-limiting example, a user of the gas turbine engine 14 (e.g., a pilot) can provide an input to the PEC 125 indicative of the shutdown 166. In another example, another engine controller (e.g., the FADEC) can automatically communicate to the PEC 125 that the gas turbine engine 14 has shutdown 166. As a non-limiting example, the PEC 125 can directly monitor whether or not combustion is actively occurring within the combustion section 20 in order to determine whether or not the shutdown 166 has occurred.

Once the shutdown 166 has occurred, the PEC 125 can perform a check to see if the supply of electrical power 130 is available to the electric machine 100, at 188. As used herein, the phrase "available to the electric machine 100" refers to whether or not there is an electrical connection between the supply of electrical power 130 and the PEC 125 to enable the PEC 125 to supply the electrical power from the supply of electrical power 130 to the electric machine 100. As discussed previously, the supply of electrical power 130 can be an on-board supply of electrical power. In such an instance, the supply of electrical power 130 would immediately be available. As discussed previously, the supply of electrical power 130 can be an off-board supply of electrical power. In such an instance, the supply of electrical power 130 may not be immediately available.

If the check, at 188, indicates that the supply of electrical power 130 is unavailable, the PEC 125 can wait, at 190, for the supply of electrical power to become available. During this waiting period, at 190, the PEC 125 can continuously or intermittently perform the check, at 188, to see if the supply of electrical power 130 is available. The waiting, at 190, can occur while the supply of electrical power 130 is being made available. As a non-limiting example, after an aircraft not including an on-board supply of electrical power lands and reaches its final destination, the aircraft first shutdowns (e.g., the shutdown 166 occurs) before the off-board supply of electrical power is made available. The off-board supply of electrical power is made available by electrically connecting, for example, a ground cart with the HTS 10.

Once the supply of electrical power 130 is available, the PEC 125 selectively couples at 192 the electric machine clutch 118. Specifically, the controller module 124 sends a runtime instruction communication or otherwise actuates the electric machine clutch 118 such that the electric machine drive shaft 108 engages the turbine shaft 40. Once the electric machine clutch 118 is actuated, at 192, the electrical pulse can be selectively supplied, at 172.

The method 170 can include additional steps not depicted. As a non-limiting example, the method 170 can include rotationally coupling, via the PEC 125, the output shaft 78 with the engine drive shaft 80 of the gas turbine engine 14 such that the HTS 10 drives a respective portion of the gas turbine engine 14. This step can occur prior to, for example, selectively supplying the supply of electrical power, at 172.

As a non-limiting example, the method 170 can include electrically decoupling the supply of electrical power 130 to the electric machine 100 if the temperature signal (e.g., the temperature signal received at 180) is indicative of the temperature reaching or going below the threshold temperature value. Put another way, the end of operation, at 184, can include electrically decoupling the supply of electrical power 130 to the electric machine 100.

As a non-limiting example, the method 170 can include deriving, via the PEC 125, a torque output of the electric machine drive shaft 108 based on the DC voltage value and the current signal received at 174. Put another way, the PEC 125, specifically the controller module 124, can utilize the known values of the voltage of the supply of electrical power 130 and the current supplied to the set of windings 116*a*, 116*b*, 116*c*, along with other known parameters such as, but not limited to, frictional forces associated with the driving of the electric machine drive shaft 108, to determine what the torque output from the electric machine drive shaft 108 is required to start, restart, perform a maintenance procedure, or shutdown the gas turbine engine 14.

Figure 8:
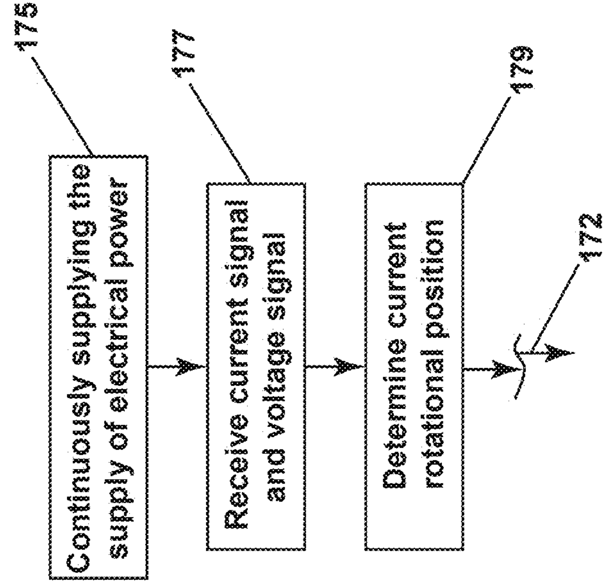
FIG. 8 is a portion of the method of FIG. 7, further comprising the mode of operation being a field-oriented mode of operation, in accordance with various aspects described herein.

FIG. 8 is a portion of the method 170 of FIG. 7, further illustrating the mode of operation according to a field-oriented mode of operation. During the field-oriented mode of operation, the method 170 operates according to a procedure between shutdown and the thermal bow motoring procedure. Specifically, the method 170 can operate according to the field-oriented mode of operation to flow the cooling air through the gas turbine engine 14, as described herein.

The method 170 comprises continuously supplying at 173, via the PEC 125 (FIGS. 2-4), the supply of electrical power 130 (FIGS. 2-4) to the electric machine 100 (FIGS. 3-4). In other words, the PEC 125 supplies a continuous flow (e.g., current) of electrical power from the supply of electrical power 130 to the electric machine 100. The continuous supply of current to the electric machine 100 causes the rotor 104 (FIGS. 2-4) to rotate continuously about the rotational axis 110 (FIGS. 2-4). Put another way, the HTS 10 is configured to continuously supply a rotational output (e.g., torque) from the output shaft 78 (FIG. 2) during the continuous supply of the electrical power 130 at 173. As such, the HTS 10 can continuously drive, for example, the engine drive shaft 80 (FIG. 1) at 173. The benefit of continuously driving the engine drive shaft 80 at 173 will be described in further detail below.

The method 170 includes continuously receiving at 175 the current signal and the DC voltage value, at the PEC 125, from the voltage sensor 136 (FIGS. 2-4) and the set of current sensors (e.g., the first current sensor 136*a*, the second current sensor 136*b*, and the third current sensor 136*c* of FIGS. 2-4), respectively. Put another way, the PEC 125 continuously monitors the current being supplied to the electric machine 100 and the voltage being supplied from the supply of electrical power 130 at 175. It will be appreciated that the DC voltage value and the current signal are received, at 175, during the time that the supply of electrical power is continuously supplied at 173.

The method 170 includes determining at 177, the rotational position of the rotor 104 through use of the current signal and the DC voltage value received, at 175. Specifically, the controller module 124 determines at 177, through use of the current signal and the DC voltage value received at 175, an instantaneous rotational position of the rotor 104. As used herein, the "instantaneous rotational position" refers to the rotor magnetic orientation at a given point in time. The controller module 124 determines through use of the current signal and the DC voltage value received, at 175, what the positioning of the rotor magnetic orientation is currently.

The method 170 according to the field-orientation operation (e.g., continuously supplying at 175, continuously receiving at 177, and determining at 179) is done for a finite amount of time. Once the finite amount of time ceases, the method 170 can move to the rotisserie mode of operation (FIG. 7) by selectively supplying at 172 the sequence of electrical pulses 146 (FIGS. 2-6) from the supply of electrical power 130. Put another way, after the field-orientation mode of operation has ended, the rotisserie mode of operation can occur.

The method 170 can include additional steps not depicted. For example, the field-orientation mode of operation can begin at 175 after other portions of the method 170 have occurred. For example, the field-orientation mode of operation can begin at 175 once the determining at 186 (FIG. 7), the check at 188 (FIG. 7), and the selectively coupling at 192 (FIG. 7) has occurred. Put another way, the field-orientation mode of operation can begin at 175 once the gas turbine engine 14 has shutdown, the supply of electrical power 130 is available to the electric machine 100, and the electric machine clutch 118 (FIG. 2) is engaged.

It is contemplated that the field-orientation mode of operation can occur after the shutdown 166 of the gas turbine engine 14 to supply the cooling air through the gas turbine engine 14. As discussed herein, the HTS 10, after the shutdown 166 (FIG. 6) of the gas turbine engine 14, can transfer torque to the engine drive shaft 80 to drive one or more respective portions of the gas turbine engine 14. The driving of the one or more respective portions of the gas turbine engine 14 can draw in an ambient airflow to define a cooling air. The field-orientation mode of operation include the continuously supplying at 173 such that the engine drive shaft 80 is continuously driven by the HTS 10.

As such, the gas turbine engine 14 continuously draws in the cooling air during the continuously supplying at 173.

The method 170 can include ending the field-orientation mode of operation. The ending of the field-orientation mode of operation can be based on a sensed temperature of the gas turbine engine 14. For example, the method 170 can include steps of monitoring a temperature of the gas turbine engine 14 through use of the temperature sensor, similar to the check at 182. Once the temperature reaches a post-shutdown threshold temperature, the PEC 125 can automatically determine that the gas turbine engine 14 does not require additional cooling. As such, the field-orientation mode of operation can be ended such that the HTS 10 is no longer continuously driving the engine drive shaft 80.

The post-shutdown threshold temperature is non-equal to the threshold temperature that is checked at 182. Specifically, the post-shutdown temperature threshold is larger than the threshold temperature that is checked at 182. The threshold temperature that is checked at 182 is a thermal bowing threshold temperature while the post-shutdown temperature threshold is a cooling temperature threshold. The thermal bowing threshold temperature is defined as a temperature required to ensure that thermal bowing does not occur if the engine drive shaft 80 is stationary (e.g., non-rotating and the end of operation at 184 occurs). The cooling temperature threshold is defined as a temperature required to ensure that various portions of the gas turbine engine 14 are cooled to a sufficient degree to prevent potential thermal damage.

It is contemplated that the field-orientation mode of operation can occur over a first total time. The first total time can be based on various factors. For example, the first total time can be defined as a total time that it takes for the gas turbine engine 14 to no longer require cooling. It will be appreciated that the time that it takes for the gas turbine engine 14 to no longer require cooling can be based on whether or not the post-shutdown threshold temperature is reached.

The rotisserie mode of operation can occur over a second total time. The second total time is defined as a summation of the set of timeframes 156*a-h*, 156*n* (FIG. 6) and the set of wait times 158*a-g*, 158*n* (FIG. 6). The second total time is greater than the first total time. As a non-limiting example, the first total time can be greater than or equal to 10 minutes and less than or equal to 4 hours. The second total time can be greater than 4 hours and less than or equal to 12 hours.

It will be appreciated that the field-orientation operation occurs prior to the first rise time 157*a* (FIG. 6). As a non-limiting example, the field-orientation operation can occur after the shutdown time 160 (FIG. 6) and before the first rise time 157*a*.

Benefits of the present disclosure include the HTS that is configured to drive the engine drive shaft over a time at an ultra-slow speed. As used herein, the term "ultra-slow speed" refers to a rotation of the engine drive shaft at the thermal bow motoring speed or the maintenance procedure speed. An ETS can include an electric machine configured to rotate the output shaft at speeds of greater than 0.1 RPM and less than or equal to 10 RPM. The ETS can be used for the thermal bow motoring procedure, but struggles with some maintenance procedures (e.g., the wash procedure) and cannot perform other procedures such as the startup procedure. The electric machine of the ETS can be a stepper motor or a conventional permanent magnetic motor. The ETS, including the stepper motor, can perform the rotisserie mode of operation but struggles at higher speeds (e.g., the wash procedures). Conversely, the ETS, including the conventional permanent magnet motor, can perform wash procedures, but struggles at the lower speeds (e.g., the rotisserie mode of operation). The ETS can, in some instances, include a gearbox that allows the ETS to reach higher speeds. However, the gearbox greatly increases the complexity of the ETS in comparison to the HTS. The increase in complexity increases the weight of the ETS and the cost of the ETS. When, however, the gearbox is used in order to allow the ETS to rotate at faster speeds, the capability of the ETS to rotate at the slower speeds necessary for the thermal bow motoring procedure or the inspection procedure are no longer possible without further complicating the ETS by, for example, allow the gearbox to automatically shift between gear ratios.

The ultra-slow rotation of the engine drive shaft (e.g., the rotation of the engine drive shaft at the thermal bow motoring speed or the maintenance procedure speed) has multiple uses. As a non-limiting example, the ultra-slow rotation of the engine drive shaft can be used to prevent thermal bowing, as described herein, by rotating the engine drive shaft at the thermal bow motoring speed. Specifically, it will be appreciated that after the shutdown process of the gas turbine engine, the heat within the gas turbine engine rises such that an uneven distribution of heat occurs. Specifically, the gravitationally upper portions of the gas turbine engine will be hotter than the gravitationally lower portions of the gas turbine engine, thus creating a thermal gradient between the upper and lower portions of the gas turbine engine. The thermal gradient, if left to get too large, causes thermal bowing. The HTS, as described herein, utilizes the HTS to rotate the engine drive shaft at the ultra-slow speeds such that over a given wait time the portions of the gas turbine engine that began in the gravitationally lower portions move to the gravitationally upper portions, and vice-versa. As such, the hot portions (e.g., the portions that began in the gravitationally upper portions) are given a chance to cool while the cold portions (e.g., the portions that began in the gravitationally lower portions) are heated. This continued cycle minimizes the thermal gradient between the gravitationally lower portions and the gravitationally upper portions; thus, reducing the effects of the thermal bowing.

The ultra-slow rotation of the engine drive shaft further allows for cooling air to be fed through the gas turbine engine after the shutdown of the gas turbine engine. As discussed herein, the HTS can be used to feed a cooling air (e.g., an ambient airflow) through the gas turbine engine after shutdown. Feeding the cooling air through the gas turbine engine after shutdown helps ensure that heat from the gas turbine engine does not stagnate and continues to be exhausted from the gas turbine engine. Further, the flow of cooling air through the gas turbine engine helps ensure that other issues, such as fuel nozzle coking, do not occur by providing cooling air to the combustion section. The reduction and/or elimination of fuel nozzle coking extends the lifespan of various portions of the combustion section (e.g., the fuel nozzles).

The ultra-slow rotation of the engine drive shaft can further be used for maintenance procedures by rotating the engine drive shaft at the maintenance procedure speed. The maintenance procedure can be inspection and/or wash procedures, as described herein. With a conventional gas turbine engine, the borescope used during a conventional inspection procedure has to be moved between the circumferentially adjacent blades in order to visually inspect each blade. The HTS as described herein, however, can be operated according to a control method that allows for the borescope to remain stationary and for the blades to be moved circumferentially within the gas turbine engine. As a non-limiting example, each blade of a given set of circumferentially spaced blades can be spaced 5° from one another. The inspection procedure can be configured to selectively supply at least a portion of the sequence of electrical pulses from the supply of electrical power in such a way that each electrical pulse of the sequence of electrical pulses rotates the engine drive shaft by 5°, thus allowing for the borescope to remain stationary.

It is contemplated that the circumferential distance between blades varies depending on the location within the gas turbine engine. For example, the blades in the furthest upstream sections of the compression section are further apart than the blades in the furthest downstream sections of the compression section. The HTS as described herein is adapted to vary the rotation during an inspection procedure based on whichever set of blades within the gas turbine engine the borescope is presently inspecting. For example, if the borescope is being used to inspect the upstream blades within the compression section where the upstream blades are, for example 20° apart, the inspection procedure can be used to move the engine drive shaft by 20° with each successive electrical pulse of the sequence of electrical pulses. If the borescope is being used to inspect the downstream blades within the compression section where the downstream blades are, for example, 0.5° apart, the inspection procedure can be used to move the engine drive shaft by 0.5° with each successive electrical pulse of the sequence of electrical pulses.

The HTS, as described herein, is further configured to allow for the engine drive shaft to remain at a given rotational position so that, for example, the inspection can occur. For example, if the borescope is being used, the engine drive shaft can be rotated to allow for a next blade in the set of circumferentially spaced blades to be inspected. Once the next blade comes into view of the borescope, the set of circumferentially spaced blades can stop being rotated; thus allowing for the next blade to be visually inspected. Once the next blade is fully inspected, the next electrical pulse in the sequence of electrical pulses can be supplied to the electric machine to cause the set of circumferentially spaced blades to move onto the next successive blade of the set of circumferentially spaced blades.

It will be appreciated that the conventional HTS does not allow for such tailored movement of the engine drive shaft. Instead, the conventional ATS or ETS is configured to, at best, rotate the engine drive shaft at a predetermined speed. The conventional ATS or ETS does not allow for the engine drive shaft to be held at a given position to allow for time to visually inspect a given blade of a set of circumferentially spaced blades. Further, the conventional ATS or ETS does not have a method of operation that allows for such small or slow movement of the engine drive shaft like the HTS described herein does.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A Hybrid Turbine Starter (HTS) for a gas turbine engine, the HTS comprising a turbine member, a turbine shaft coupled to the turbine member, an electric machine having a rotor and an electric machine drive shaft, the electric machine drive shaft being rotatable about a rotational axis and selectively coupled to the turbine shaft, and a Power Electronics Converter (PEC) module, comprising a current sensor configured to provide a current signal indicative of a current supplied to the electric machine from a supply of electrical power, a voltage sensor configured to provide a direct current (DC) voltage value indicative of a voltage supplied to the electric machine from the supply of electrical power, and a controller module configured to, during a mode of operation of the electric machine supply an electrical power from the supply of electrical power to the electric machine, receive the current signal and the DC voltage value based on the selective coupling of the supply of electrical power to the electric machine, and based on the current signal and the DC voltage value, determine a instantaneous rotational position of the rotor.

The HTS of any preceding clause, wherein the mode of operation is a rotisserie mode of operation and the controller module is configured to selectively supply the electrical power from the supply of electrical power in the form of a first electrical pulse of a sequence of electrical pulses to the electric machine, receive the current signal and the DC voltage value of the first electrical pulse, and based on the current signal and the DC voltage value, determine a voltage value required to create a next electrical pulse in the sequence of electrical pulses.

The HTS of any preceding clause, wherein the next electrical pulse in the sequence of electrical pulses from the first electrical pulses is a second electrical pulse, and the controller module is configured to selectively supply the electrical power from the supply of electrical power in the form of the second electrical pulse to the electric machine.

The HTS of any preceding clause, wherein the controller module is configured to receive the current signal and the DC voltage value of the second electrical pulse, and based on the current signal and the DC voltage value of the second electrical pulse, determine a voltage value required to create a next electrical pulse in the sequence of electrical pulses.

The HTS of any preceding clause, wherein the PEC is configured to selectively supply the first electrical pulse at a first time, wait a wait time after the first time, and selectively supply the second electrical pulse at a second time after the first time and the wait time.

The HTS of any preceding clause, wherein the PEC is configured to for each respective electrical pulse of the sequence of electrical pulses selectively supply the respective electrical pulse from the supply of electrical power, receive the current signal and the DC voltage value of the respective electrical pulse, and based on the current signal and the DC voltage value of the respective electrical pulse, determine a voltage value required to create a next electrical pulse in the sequence of electrical pulses.

The HTS of any preceding clause, wherein the PEC is coupled to a temperature sensor that provides a temperature signal indicative of a temperature of the gas turbine engine after shutdown of the gas turbine engine.

The HTS of any preceding clause, wherein the controller module is configured to selectively supply the sequence of electrical pulses based on the temperature signal.

The HTS of any preceding clause, wherein the controller module is configured to selectively electrically decouple the supply of electrical power to the electric machine once the temperature signal has reached or is less than a threshold temperature value.

The HTS of any preceding clause, wherein the mode of operation is a field-oriented mode of operation of the electric machine and the controller module is configured to continuously supply the electrical power from the supply of electrical power to the electric machine, and continuously receive the current signal and the DC voltage value based on the continuous coupling of the supply of electrical power to the electric machine.

The HTS of any preceding clause, wherein after the field-oriented mode of operation, the controller module is configured to operate the electric machine according to a rotisserie mode of operation of the electric machine by selectively supplying a sequence of electrical pulses from the supply of electrical power to the electric machine, receiving the current signal and the DC voltage value for each respective electrical pulse of the sequence of electrical pulses, and based on the current signal and the DC voltage value, determining an instantaneous rotational position of the rotor after each respective electrical pulse of the sequence of electrical pulses.

The HTS of any preceding clause, wherein a total time that the field-oriented mode of operation occurs is less than a total time that the rotisserie mode of operation of the electric machine occurs.

The HTS of any preceding clause, wherein the controller module is configured to end the field-oriented mode of operation when a temperature of the gas turbine engine reaches a post-shutdown threshold temperature.

The HTS of any preceding clause, further comprising an electric machine clutch configured to selectively couple the electric machine drive shaft to the turbine shaft.

The HTS of any preceding clause, wherein the controller module is configured to actuate the electric machine clutch such that that the electric machine clutch is engaged with the turbine shaft.

The HTS of any preceding clause, wherein the electric machine clutch comprises an engagement body and a clutch actuator.

The HTS of any preceding clause, further comprising a housing defining an interior with the electric machine and the turbine member being located within the interior.

The HTS of any preceding clause, wherein the PEC is provided within exterior of the interior.

The HTS of any preceding clause, further comprising an output drive shaft selectively coupled to an engine drive shaft of the gas turbine engine.

The HTS of any preceding clause, wherein the controller module is configured to selectively couple the supply of electrical power to the electric machine after shutdown of the gas turbine engine.

The HTS of any preceding clause, wherein after shutdown of the gas turbine engine and before selectively coupling the supply of electrical power to the electric machine, the controller module is configured to determine if the supply of electrical power is accessible to the HTS.

The HTS of any preceding clause, wherein if the supply of electrical power is accessible to the HTS, the controller module is configured to selectively supply the first electrical pulse.

The HTS of any preceding clause, wherein the controller module is configured to rotationally couple the electric machine drive shaft to the turbine shaft.

The HTS of any preceding clause, wherein the supply of electrical power is an on-board supply of electrical power that is permanently accessible to the HTS.

The HTS of any preceding clause, wherein the supply of electrical power is an off-board supply of electrical power that is accessible to the HTS after or during a shutdown process of the gas turbine engine.

The HTS of any preceding clause, wherein the off-board supply of electrical power is a ground cart.

A method of operating a Hybrid Turbine Starter (HTS) during a mode of operation, the HTS comprising a turbine member, a turbine shaft coupled to the turbine member, an electric machine having a rotor and an electric machine drive shaft selectively coupled to the turbine shaft, and a Power Electronics Converter (PEC), the method comprising supplying, via the PEC, a supply of electrical power to the electric machine, receiving, via the PEC, a current signal from a current sensor indicative of a current being supplied to the electric machine from the supply of electrical power, receiving, via the PEC, a direct current (DC) voltage value from a voltage sensor indicative of a voltage being supplied to the electric machine from the supply of electrical power, based on the current signal and the DC voltage value, determining, via the PEC, a rotational orientation of the rotor.

The method of any preceding clause, wherein the mode of operation is a rotisserie mode of operation and the method further comprises selectively supplying, via the PEC, the supply of electrical power in the form of a first electrical pulse of a sequence of electrical pulses to the electric machine, receiving, via the PEC, a current signal from a current sensor indicative of a current of the first electrical pulse, receiving, via the PEC, the DC voltage value from a voltage sensor indicative of a voltage being supplied from a supply of electrical power, and based on the current signal and the DC voltage value, determining, via the PEC, a voltage value required to create a next electrical pulse in the sequence of electrical pulses.

The method of any preceding clause, wherein the next electrical pulse in the sequence of electrical pulses from the first electrical pulses is a second electrical pulse, and the method further comprises selectively supplying, via the PEC, the supply of electrical power in the form of the second electrical pulse to the electric machine.

The method of any preceding clause, further comprising:
receiving, via the PEC, a current signal from the current sensor indicative of a current of the second electrical pulse;

The method of any preceding clause, further comprising selectively supplying the first electrical pulse at a first time, waiting a wait time after the first time, and selectively supplying the second electrical pulse at a second time after the first time and the wait time.

The method of any preceding clause, further comprising receiving the current signal and the DC voltage value of each respective electrical pulse of the sequence of electrical pulses, and based on the current signal and the DC voltage value of the respective electrical pulse, determining voltage value required to create a next electrical pulse in the sequence of electrical pulses.

The method of any preceding clause, further comprising after shutdown of the gas turbine engine receiving, via the PEC, a temperature signal indicative of a temperature of at least one portion of the gas turbine engine, based on the temperature signal, selectively electrically supplying the sequence of electrical pulses, and rotationally coupling, via the PEC, an output drive shaft of the HTS with an engine drive shaft of the gas turbine engine such that the HTS drives a respective portion of the gas turbine engine.

The method of any preceding clause, further comprising electrically decoupling the supply of electrical power to the electric machine if the temperature signal is indicative of the temperature reaching of going below a threshold temperature value.

The method of any preceding clause, further comprising determining, via the PEC, if the supply of electrical power is available to the electric machine.

The method of any preceding clause, wherein the HTS comprises an electric machine clutch selectively coupling the electric machine drive shaft to the turbine shaft, and the method further comprises selectively coupling, via the PEC, the electric machine drive shaft to the turbine shaft if supply of electrical power is available to the electric machine.

The method of any preceding clause, wherein the electric machine clutch comprises an engagement body and a clutch driver.

The method of any preceding clause, wherein the HTS comprises a housing defining an interior with the electric machine and the turbine member being located within the interior.

The method of any preceding clause, wherein the PEC is provided within an interior of the HTS.

The method of any preceding clause, wherein the HTS comprises an output drive shaft, and the method further comprises selectively coupling, via the PEC, the output drive shaft to an engine drive shaft of a gas turbine engine.

The method of any preceding clause, further comprising after shutdown of a gas turbine engine selectively supplying the sequence of electrical pulses.

The method of any preceding clause, further comprising, after shutdown of the gas turbine engine determining, via the PEC, the supply of electrical power is accessible to the HTS.

The method of any preceding clause, further comprising after shutdown of the gas turbine engine selectively supplying the sequence of electrical pulses if the supply of electrical power is accessible to the HTS.

The method of any preceding clause, further comprising rotationally coupling, via the PEC, the electric machine drive shaft to the turbine shaft after or at a same time as supplying the first electrical pulse and before supplying a second electrical pulse of the sequence of electrical pulses.

The method of any preceding clause, further comprising deriving, via the PEC, a torque output of the electric machine drive shaft based on the DC voltage value and the current signal.

The method of any preceding clause, wherein the supply of electrical power is an on-board supply of electrical power that is permanently accessible to the HTS.

The method of any preceding clause, wherein the supply of electrical power is an off-board supply of electrical power that is accessible to the HTS after or during a shutdown process of the gas turbine engine.

The method of any preceding clause, wherein the off-board supply of electrical power is a ground cart.

The method of any preceding clause, wherein the mode of operation is a field-oriented mode of operation of the electric machine and the method further comprise continuously supplying the supply of electrical power to the electric machine, continuously receiving, via the PEC, the current signal from the current sensor indicative of the current being supplied to the electric machine from the supply of electrical power, continuously receiving, via the PEC, the DC voltage value from the voltage sensor indicative of the voltage being supplied to the electric machine from the supply of electrical power, based on the current signal and the DC voltage value, determining an instantaneous rotational orientation of the rotor.

The method of any preceding clause, wherein after the field-oriented mode of operation, the method of operation is a rotisserie mode of operation, and during the rotisserie mode of operation the method comprises selectively supplying a sequence of electrical pulses from the supply of electrical power to the electric machine, receiving the current signal and the DC voltage value for each respective electrical pulse of the sequence of electrical pulses, and based on the current signal and the DC voltage value, determining a voltage value required to create a next electrical pulse in the sequence of electrical pulses.

The method of any preceding clause, wherein a total time that the field-oriented mode of operation occurs is less than a total time that the rotisserie mode of operation of the electric machine occurs.

The method of any preceding clause, wherein the controller module is configured to end the field-oriented mode of operation when a temperature of the gas turbine engine reaches a post-shutdown threshold temperature.

A hybrid turbine starter (HTS) for a gas turbine engine, HTS comprising a turbine member, a turbine shaft coupled to the turbine member, an electric machine having a rotor rotatable about a rotational axis, and a stator having a set of windings, the rotor being selectively coupled with the turbine shaft, the rotor defining a rotor magnetic orientation, and a controller module configured to supply, during a first timeframe, a first electrical pulse from a supply of electrical power through the set of windings to define a first stator magnetic orientation causing the rotor to align the rotor magnetic orientation with the first stator magnetic orientation, and supply, during a second timeframe after the first time, a second electrical pulse from the supply of electrical power through the set of windings to define a second stator magnetic orientation, the second stator magnetic orientation being circumferentially offset from the rotor magnetic orientation and causing a rotational movement of the rotor about the rotational axis that aligns the rotor magnetic orientation with the second stator magnetic orientation.

The HTS of any preceding clause, wherein the gas turbine engine comprises an engine drive shaft with the HTS being rotationally couplable to the engine drive shaft, and the rotation of the rotor by the controller module operably rotates the engine drive shaft.

The HTS of any preceding clause, wherein the controller module is configured to rotate the engine drive shaft for a timeframe after shutdown of the gas turbine engine.

The HTS of any preceding clause, wherein the rotation of the rotor by the controller module operably rotates the engine drive shaft at a speed of greater than 0 rpm and less than or equal to 650 rpm.

The HTS of any preceding clause, wherein the timeframe is a function of a temperature of the gas turbine engine.

The HTS of any preceding clause, wherein the controller module is configured to supply a sequence of electrical pulses from the supply of electrical power, the sequence of electrical pulses including the first electrical pulse and the second electrical pulse, with each electrical pulse of the sequence of electrical pulses being fed to the set of windings to define a respective stator magnetic orientation offset from the rotor magnetic orientation.

The HTS of any preceding clause, wherein each successive electrical pulse of the sequence of electrical pulses is configured to cause a rotational movement of the rotor about the rotational axis that aligns the rotor magnetic orientation with the respective stator magnetic orientation of the electrical pulse, the sequence of electrical pulses configured to rotate the rotor about in a common direction.

The HTS of any preceding clause, wherein the electric machine is a three-phase electric machine.

The HTS of any preceding clause, wherein the first timeframe and the second timeframe are each a non-zero amount of time.

The HTS of any preceding clause, wherein the first timeframe and the second timeframe are each greater than 0 seconds and less than or equal to 10 seconds.

The HTS of any preceding clause, wherein the controller module is configured to wait a period of time after the first timeframe before supplying the second electrical pulse to define a wait time.

The HTS of any preceding clause, wherein the wait time is greater than 0 seconds and less than or equal to 100 seconds.

The HTS of any preceding clause, wherein the wait time is defined as a period of time that it takes for the rotor magnetic orientation to align with the second stator magnetic orientation from the first stator magnetic orientation.

The HTS of any preceding clause, wherein a torque generated by the electric machine in response to the first electrical pulse is a function of the first timeframe and a current amplitude of the first electrical pulse, and a torque generated by the electric machine in response to the second electrical pulse is a function of the second time frame and a current amplitude of the second electrical pulse, respectively.

The HTS of any preceding clause, wherein the HTS comprises a housing defining an interior, and the electric machine and the turbine member are located within the interior.

The HTS of any preceding clause, wherein the controller module is configured to, after shutdown of the gas turbine engine supply from the first electrical pulse from the supply of electrical power, during the first timeframe, and supply the second electrical pulse, during the second timeframe after the first timeframe.

The HTS of any preceding clause, wherein a torque required to drive a respective portion of the gas turbine engine is a function of a current amplitude of the first electrical pulse and the second electrical pulse.

The HTS of any preceding clause, wherein the supply of electrical power is a supply of direct current electrical power.

The HTS of any preceding clause, wherein the supply of electrical power is located on an aircraft and is immediately accessible to the HTS after shutdown of the gas turbine engine.

The HTS of any preceding clause, wherein the supply of electrical power is located on a ground cart and is not immediately accessible to the HTS after shutdown of the gas turbine engine.

What is claimed is:

1. A Hybrid Turbine Starter (HTS) for a gas turbine engine, the HTS comprising:
- a turbine member;
- a turbine shaft coupled to the turbine member;
- an electric machine having a rotor and an electric machine drive shaft, the electric machine drive shaft being rotatable about a rotational axis and selectively coupled to the turbine shaft; and
- a Power Electronics Converter (PEC) module, comprising:
  - a current sensor configured to provide a current signal indicative of a current supplied to the electric machine from a supply of electrical power;
  - a voltage sensor configured to provide a direct current (DC) voltage value indicative of a voltage supplied to the electric machine from the supply of electrical power; and
  - a controller module configured to, during a mode of operation of the electric machine:
  - supply an electrical power from the supply of electrical power to the electric machine;
  - receive the current signal and the DC voltage value based on the supply of electrical power to the electric machine; and
  - based on the current signal and the DC voltage value, determine an instantaneous rotational position of the rotor.

2. The HTS of claim 1, wherein the mode of operation is a rotisserie mode of operation and the controller module is configured to:
- selectively supply the electrical power from the supply of electrical power in a form of a first electrical pulse of a sequence of electrical pulses to the electric machine;
- receive the current signal and the DC voltage value of the first electrical pulse; and
- based on the current signal and the DC voltage value, determine a voltage value required to create a next electrical pulse in the sequence of electrical pulses.

3. The HTS of claim 2, wherein the next electrical pulse in the sequence of electrical pulses from the first electrical pulses is a second electrical pulse, and the controller module is configured to selectively supply the electrical power from the supply of electrical power in a form of the second electrical pulse to the electric machine.

4. The HTS of claim 3, wherein the controller module is configured to:
- receive the current signal and the DC voltage value of the second electrical pulse; and
- based on the current signal and the DC voltage value of the second electrical pulse, determine a voltage value required to create a next electrical pulse in the sequence of electrical pulses.

5. The HTS of claim 4, wherein the PEC is configured to:
- selectively supply the first electrical pulse at a first time;
- wait a wait time after the first time; and
- selectively supply the second electrical pulse at a second time after the first time and the wait time.

6. The HTS of claim 3, wherein the PEC is coupled to a temperature sensor that provides a temperature signal indicative of a temperature of the gas turbine engine after shutdown of the gas turbine engine.

7. The HTS of claim 6, wherein the controller module is configured to selectively supply the sequence of electrical pulses based on the temperature signal.

8. The HTS of claim 1, wherein the mode of operation is a field-oriented mode of operation of the electric machine and the controller module is configured to:

continuously supply the electrical power from the supply of electrical power to the electric machine; and continuously receive the current signal and the DC voltage value based on the supply of electrical power to the electric machine.

9. The HTS of claim 8, wherein after the field-oriented mode of operation, the controller module is configured to operate the electric machine according to a rotisserie mode of operation of the electric machine by:

selectively supplying a sequence of electrical pulses from the supply of electrical power to the electric machine;

receiving the current signal and the DC voltage value for each respective electrical pulse of the sequence of electrical pulses; and based on the current signal and the DC voltage value, determining an instantaneous rotational position of the rotor after each respective electrical pulse of the sequence of electrical pulses.

10. The HTS of claim 1, further comprising an electric machine clutch configured to selectively couple the electric machine drive shaft to the turbine shaft.

11. The HTS of claim 10, wherein the controller module is configured to actuate the electric machine clutch such that that the electric machine clutch is engaged with the turbine shaft.

12. The HTS of claim 1, further comprising a housing defining an interior with the electric machine and the turbine member being located within the interior.

13. The HTS of claim 1, wherein the controller module is configured to selectively couple the supply of electrical power to the electric machine after shutdown of the gas turbine engine.

14. The HTS of claim 13, wherein after shutdown of the gas turbine engine and before selectively coupling the supply of electrical power to the electric machine, the controller module is configured to determine if the supply of electrical power is accessible to the HTS.

15. The HTS of claim 1, wherein the supply of electrical power is an on-board supply of electrical power that is permanently accessible to the HTS.

16. The HTS of claim 1, wherein the supply of electrical power is an off-board supply of electrical power that is accessible to the HTS after or during a shutdown of the gas turbine engine.

17. A method of operating a Hybrid Turbine Starter (HTS) during a mode of operation, the HTS comprising a turbine member, a turbine shaft coupled to the turbine member, an electric machine having a rotor and an electric machine drive shaft selectively coupled to the turbine shaft, and a Power Electronics Converter (PEC), the method comprising:

supplying, via the PEC, a supply of electrical power to the electric machine;

receiving, via the PEC, a current signal from a current sensor indicative of a current being supplied to the electric machine from the supply of electrical power;

receiving, via the PEC, a direct current (DC) voltage value from a voltage sensor indicative of a voltage being supplied to the electric machine from the supply of electrical power; and based on the current signal and the DC voltage value, determining, via the PEC, a rotational orientation of the rotor.

18. The method of claim 17, wherein the mode of operation is a rotisserie mode of operation and the method further comprises:

selectively supplying, via the PEC, the supply of electrical power in a form of a first electrical pulse of a sequence of electrical pulses to the electric machine;

receiving, via the PEC, a current signal from a current sensor indicative of a current of the first electrical pulse;

receiving, via the PEC, the DC voltage value from a voltage sensor indicative of a voltage being supplied from a supply of electrical power; and based on the current signal and the DC voltage value, determining, via the PEC, a voltage value required to create a next electrical pulse in the sequence of electrical pulses.

19. The method of claim 18, wherein the next electrical pulse in the sequence of electrical pulses from the first electrical pulses is a second electrical pulse, and the method further comprises selectively supplying, via the PEC, the supply of electrical power in a form of the second electrical pulse to the electric machine.

20. The method of claim 19, further comprising:

receiving, via the PEC, a current signal from the current sensor indicative of a current of the second electrical pulse;

receiving, via the PEC, a direct current (DC) voltage value from the voltage sensor; and based on the current signal and the DC voltage value of the second electrical pulse, determining, via the PEC, a voltage value required to create a next electrical pulse in the sequence of electrical pulses.

* * * * *